US009728188B1

(12) United States Patent
Rosen et al.

(10) Patent No.: US 9,728,188 B1
(45) Date of Patent: Aug. 8, 2017

(54) METHODS AND DEVICES FOR IGNORING SIMILAR AUDIO BEING RECEIVED BY A SYSTEM

(71) Applicant: Amazon Technologies, Inc., Seattle, WA (US)

(72) Inventors: Alexander David Rosen, Somerville, MA (US); Michael James Rodehorst, Belmont, MA (US); George Jay Tucker, Cambridge, MA (US); Aaron Lee Mathers Challenner, Cambridge, MA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 15/195,587

(22) Filed: Jun. 28, 2016

(51) Int. Cl.
*G10L 15/22* (2006.01)
*G10L 15/08* (2006.01)
(Continued)

(52) U.S. Cl.
CPC .............. *G10L 15/22* (2013.01); *G10L 15/08* (2013.01); *G10L 15/285* (2013.01); *G10L 25/51* (2013.01);
(Continued)

(58) Field of Classification Search
CPC ............................. G10L 19/018; G10L 25/51
See application file for complete search history.

(56) References Cited

U.S. PATENT DOCUMENTS 6,434,520 B1 * 8/2002 Kanevsky ......... G06F 17/30746
704/243
7,698,008 B2 * 4/2010 Steinberg ................ G10L 25/48
700/94
(Continued)

OTHER PUBLICATIONS

"Compare 2 audio files—with a twist", Asked by MadMax2015 on Jul. 27, 2015, [retrieved on Mar. 19, 2017] https://www.mathworks.com/matlabcentral/answers/231384-compare-2-audio-files-with-a-twist.*
(Continued)

*Primary Examiner* — Matthew Baker
(74) *Attorney, Agent, or Firm* — Robert W. Morris; Eckert Seamans Cherin & Mellott, LLC

(57) ABSTRACT

Systems and methods for detecting similar audio being received by separate voice activated electronic devices, and ignoring those commands, is described herein. In some embodiments, a voice activated electronic device may be activated by a wakeword that is output by the additional electronic device, such as a television or radio, may capture audio of sound subsequently following the wakeword, and may send audio data representing the sound to a backend system. Upon receipt, the backend system may, in parallel to performing automated speech recognition processing to the audio data, generate a sound profile of the audio data, and may compare that sound profile to sound profiles of recently received audio data and/or flagged sound profiles. If the generated sound profile is determined to match another sound profiles, then the automated speech recognition processing may be stopped, and the voice activated electronic (Continued)

device may be instructed to return to a keyword spotting mode. If the matching sound profile is not already stored in a database of known sound profiles, it can be stored for future comparisons.

20 Claims, 9 Drawing Sheets

(51) Int. Cl.
  *G10L 25/51* (2013.01)
  *G10L 15/28* (2013.01)
  *G10L 19/08* (2013.01)
(52) U.S. Cl.
  CPC ........ *G10L 19/08* (2013.01); *G10L 2015/088* (2013.01); *G10L 2015/227* (2013.01)

(56) References Cited

U.S. PATENT DOCUMENTS

| | | | | |
|---|---|---|---|---|
| 8,606,293 B2* | 12/2013 | Kim | ................... | G06Q 30/0261 455/418 |
| 9,047,371 B2* | 6/2015 | Mohajer | ........... | G06F 17/30743 |
| 9,071,371 B2* | 6/2015 | Wang | ..................... | H04H 60/27 |
| 9,286,912 B2* | 3/2016 | Srinivasan | .............. | G10L 25/54 |
| 9,435,878 B1* | 9/2016 | Sharifi | ............... | G06F 17/30743 |
| 9,529,907 B2* | 12/2016 | Roblek | .................... | G10L 25/54 |
| 2002/0116195 A1* | 8/2002 | Pitman | .................... | G06Q 30/06 704/260 |
| 2004/0172240 A1* | 9/2004 | Crockett | ................. | G10L 25/48 704/205 |
| 2007/0055500 A1* | 3/2007 | Bilobrov | ........... | G06F 17/30743 704/217 |
| 2008/0208851 A1* | 8/2008 | Briggs | .................... | H04H 20/14 |
| 2010/0322469 A1* | 12/2010 | Sharma | ................. | G10L 19/018 382/100 |
| 2013/0178966 A1* | 7/2013 | Magnusson, Jr. .. | | G06K 9/00744 700/94 |
| 2014/0330413 A1* | 11/2014 | Anniballi | .......... | G06F 17/30769 700/94 |
| 2015/0373468 A1* | 12/2015 | Shayandeh | ............ | H04R 29/00 381/56 |
| 2016/0042761 A1* | 2/2016 | Motta | ..................... | G10L 25/51 700/94 |

OTHER PUBLICATIONS

Article—Philips Research—A Highly Robust Audio Fingerprinting System.

* cited by examiner

METHODS AND DEVICES FOR IGNORING SIMILAR AUDIO BEING RECEIVED BY A SYSTEM

BACKGROUND

Voice activated electronic devices are becoming more prevalent. An individual speaks a command to activate such a device. In response to a voice command, the device performs various functions, such as outputting audio.

DETAILED DESCRIPTION

Figure 1:
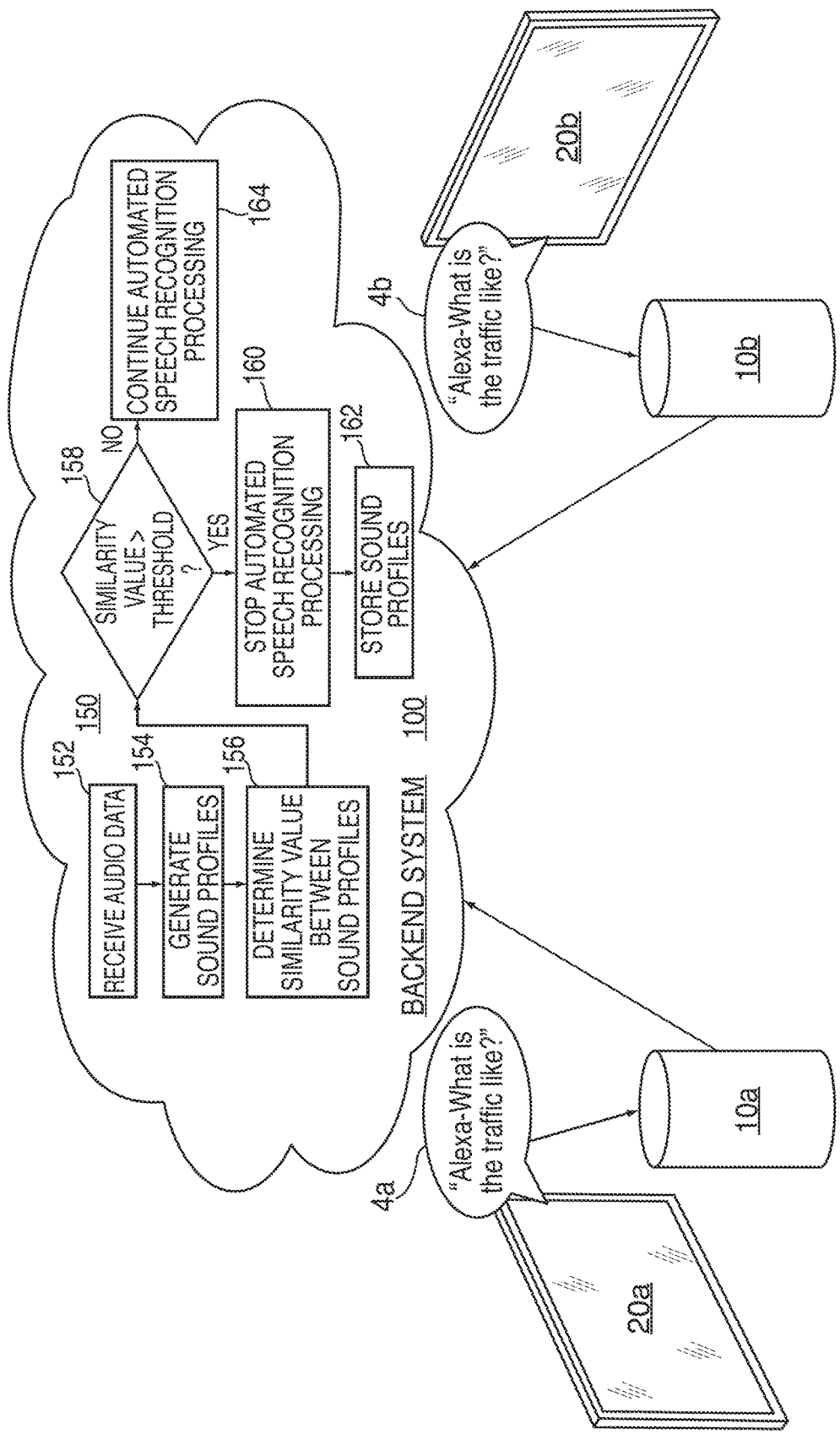
FIG. 1 is an illustrative diagram of a system for ignoring first audio data and second audio data, which both represent the same command and are received within a temporal window, in accordance with various embodiments.

The present disclosure, as set forth below, is generally directed to various embodiments of systems and methods for ignoring similar audio commands received by two or more sound controlled electronic devices at a substantially same time. Two or more physically separated sound controlled electronic devices may hear the same audio content being broadcast (e.g., from a media event, such as a television commercial, radio program, television show, and/or movie), and may be triggered by an utterance of a wakeword within the audio content at a substantially same time, or otherwise within a relatively small temporal interval. In response to being triggered, each sound controlled electronic device may record the audio content, and may send, at substantially the same time, audio data representing the audio content to a backend system for generating a response.

To prevent the backend system from generating responses to a command included within a media event's broadcast (e.g., commands that are do not originate from a human source), the backend system may identify similar audio data prior to text data representing the audio data being generated. This may allow the backend system to ignore the audio data, thereby conserving the backend system's computing resources and processing capabilities. In some embodiments, a sound profile, such as an audio fingerprint, unique to audio data received by the backend system may be generated using a sound profile generation module. In one embodiment, sound profile generation may occur in parallel to automated speech recognition processing. For instance, at a substantially same time as text data of a spoken command is being generated from the received audio data, the backend system may also generate a sound profile of the spoken command. The generated sound profile may be compared within various other sound profiles to determine whether the generated sound profile matches any other sound profile(s). For example, the generated sound profile may be compared with sound profiles of recently received audio data, as well as, or alternatively, to flagged sound profiles (e.g., sound profiles of known audio). If a match is found, then the audio is presumed to come from a media broadcast, rather than from the device's owner, and therefore the automated speech recognition processing that currently is being performed on that audio data (e.g., text data generation) may be stopped. Furthermore, a requesting sound controlled electronic device that sent the audio data may then be sent an instruction to return to a keyword spotting mode or standby mode, where the sound controlled electronic device returns to monitoring local audio for utterances of the wakeword. This may prevent the backend system from continuing to process audio data that was likely not generated by a human (e.g., emanating from a television commercial). Still further, this may prevent the backend system from sending a response to that audio data to the requesting sound controlled electronic device, which may be bothersome and confusing.

As an illustrative example, a first sound controlled electronic device may be located proximate to a first television at a first residence, and a second sound controlled electronic device may be located proximate to a second television at a second residence. Both the first and second televisions may be tuned to a same channel, and may therefore "hear" similar audio. If, for example, the televisions play a commercial that includes an utterance of a wakeword of sound controlled electronic devices, then both the first and second sound controlled electronic devices may, in response, be activated. In this scenario, both the first and second sound controlled electronic devices may record audio of the command, and may send first audio data and second audio data representing the command, respectively, to a backend system. In some embodiments, because both the first and second sound controlled electronic devices were activated by the commercial at substantially the same time, both the first audio data and the second audio data may be received by the backend system at substantially the same time, or within a relatively small temporal window of one another.

Upon receipt by the backend system, a sound profile generation module may generate a first audio fingerprint of the first audio data and a second audio fingerprint of the second audio data. A similarity value may be determined by comparing the first audio fingerprint and the second audio fingerprint with one another. If similarity value is determined to be greater than a predefined similarity threshold value, then this may indicate that the first audio data and the second audio data represent the same command. In this scenario, the backend system may be instructed to stop automated speech recognition processing from being performed on the first audio data and the second audio data. Furthermore, the backend system may generate and send an instruction to return to a keyword spotting mode to the first sound controlled electronic device and second sound controlled electronic device.

In some embodiments, the backend system may store sound profiles within a sound profile database, where the stored sound profiles correspond to recently received audio data. For example, the sound profile database may store 100 sound profiles corresponding to a 100 most recently received audio data. As another example, a sound profile database on the backend system may store sound profiles corresponding to audio data received within the last few seconds (e.g., two seconds, five seconds, ten seconds, etc.). Upon receipt of new audio data from a requesting sound controlled electronic device, the backend system may generate a sound profile of the new audio data, and may determine similarity values of the newly generated sound profile and each stored sound profile (e.g., corresponding to the 100 most recently received audio data or received within the last few seconds). If one of the similarity values is determined to be greater than a predefined similarity threshold value, then this likely indicates that the newly received audio data originated from a non-human source, as the likelihood is substantially small that two physically separate sound controlled electronic devices both detecting the same audio data within a relatively small temporal window of one another. Therefore, any remaining automated speech recognition processing being performed on the newly received audio data may be stopped, and the requesting sound controlled electronic device may be sent an instruction to return to a keyword spotting mode.

In some embodiments, if two or more sound profiles are determined to be similar to one another, then those sound profiles may be stored as flagged sound profiles. For example, a sound profile of recently received audio data may be determined to match another sound profile of other recently received audio data. In this instance, both sets of audio data likely originated from a non-human source, such as a television or radio commercial, and one or both of the sound profiles may be stored on the backend system, such as within a sound profile database, as a flagged sound profile. If additional audio data is received from another sound controlled electronic device, a sound profile of the additional audio data may be generated and compared with the flagged sound profile. If the newly generated sound profile matches the flagged sound profile, then the newly received audio data most likely originated from the same non-human source, and an instruction to ignore the additional audio data may be generated and sent to the requesting sound controlled electronic device.

A sound profile may be generated, in some embodiments, by a sound profile generation module, or by a sound profile generation component of automated speech recognition processing. In some embodiments, received audio data of a sound or phrase may be segmented into overlapping audio frames having a particular temporal length. For example, the audio data may be segmented into audio frames having a temporal length of approximately 380 milliseconds. A spectral representation (e.g., an amount of energy) of the audio data within each overlapping audio frame may then be determined by performing a Fast Fourier Transform ("FFT") on the overlapping audio frames. Next, a number of non-overlapping frequency bands may be selected. For example, thirty-three (33) non-overlapping frequency bands residing with a frequency range of approximately 300 Hz to 2,000 Hz may be selected corresponding to a 32-bit signal. For each frequency band and audio frame, an energy difference along a temporal direction and a frequency direction may be determined. A "1"-bit output may be generated if the energy difference is greater than 0, whereas a "0"-bit output may be generated if the energy difference is less than or equal to 0. This process may be repeated for each overlapping audio frame over a temporal duration of the audio data to generate a bitmask representing the audio data. The bitmask may then be stored as the sound profile (e.g., audio fingerprint) on the backend system, for instance within a sound profile database.

A sound controlled electronic device, as described herein, may correspond to any device capable of being activated in response to detection of a specific sound (e.g., a word, a phoneme, a phrase or grouping of words, or any other type of sound, or any series of temporally related sounds). For example, a voice activated electronic device is one type of sound controlled electronic device. Such voice activated electronic devices, for instance, may be capable of generating and sending audio data to a backend system in response detecting a wakeword.

Spoken voice commands, in some embodiments, may be prefaced by a wakeword, which may also be referred to as a trigger expression, wake expression, or activation word. In response to detecting an utterance of the wakeword, a voice activated electronic device may be configured to detect and interpret any words that subsequently follow the detected wakeword as actionable inputs or commands. In some embodiments, the voice activated electronic device may be activated by a phrase or grouping of words, which the voice activated electronic device may also be configured to detect. The voice activated electronic device, therefore, may also be able to detect and interpret any words subsequently following that phrase or grouping of words.

As used herein, the term "wakeword" may correspond to a "keyword" or "key phrase," an "activation word" or "activation words," or a "trigger," "trigger word," or "trigger expression." One exemplary wakeword may be a name, such as the name, "Alexa," however persons of ordinary skill in the art will recognize that the any word (e.g., "Amazon"), or series of words (e.g., "Wake Up" or "Hello, Alexa") may alternatively be used as the wakeword. Furthermore, the wakeword may be set or programmed by an individual operating a voice activated electronic device, and in some embodiments more than one wakeword (e.g., two or more different wakewords) may be available to activate a voice activated electronic device. In yet another embodiment, the trigger that is used to activate a voice activated electronic device may be any series of temporally related sounds.

A voice activated electronic device may monitor audio input data detected within its local environment using one or more microphones, transducers, or other audio input devices located on, or in communication with, the voice activated electronic device. The voice activated electronic device may, in some embodiments, then provide the audio data representing the detected audio input data to a backend system for processing and analyzing the audio data, and providing a response to the audio data for the voice activated electronic device. Additionally, the voice activated electronic device may store one or more wakewords within its local memory. If a determination is made that audio data received from the audio input devices (e.g., microphones) matches the wakeword, the voice activated electronic device may begin sending all audio data to a backend system.

In some embodiments, the voice activated electronic device may be located proximate to a non-human audio source, such as a television, radio, computer, speaker, or any other object capable of making sound. The voice activated electronic device may be capable of analyzing the audio output by one or more of these devices for occurrences of the wakeword. For instance, a voice activated electronic device may be activated by a television commercial that includes an utterance of the wakeword. In response to detecting the wakeword's utterance, the voice activated electronic device may begin communicating with a backend system to respond to the command that subsequently follows the wakeword's utterance.

In some embodiments, the trigger may be a non-verbal sound. For example, the sound of a door opening, an alarm going off, glass breaking, a telephone ringing, or any other sound may alternatively be used to activate a sound controlled electronic device. In this particular scenario, detection of a non-verbal sound may occur in a substantially similar manner as that of a verbal wakeword for a voice activated electronic device. For example, the sound of a door opening, when detected, may activate a sound activate electronic device, which in turn may activate a burglar alarm.

FIG. 1 is an illustrative diagram of a system for ignoring first audio data and second audio data both, which both represent the same command and that are received within a temporal window, in accordance with various embodiments. In one exemplary, non-limiting embodiment, a first voice activated electronic device 10a may be located proximate to a first television 20a, and a second voice activated electronic device 10b may be located proximate to a second television 20b. As used herein, the term "proximate" indicates that both voice activated electronic devices 10a and 10b are located close enough to televisions 20a and 20b, respectively, such that any microphone located on or in communication with voice activated electronic devices 10a and 10b are capable of receiving audio signals that emanate from either of televisions 20a and 20b, respectively. In the exemplary embodiment, voice activated electronic device 10a and television 20a may be located within a first local environment, such as a first residence, while voice activated electronic device 10b and television 20b may be located within a second local environment, such as a second residence.

Televisions 20a and 20b may be capable of presenting video and/or audio, which in some embodiments may be detectable by voice activated electronic devices 10a and 10b, respectively. For example, televisions 20a and 20b may play a television commercial, television show, movie, and/or any other video, or any audio (e.g., a song) thereon. Persons of ordinary skill in the art will recognize that although FIG. 1 includes televisions 20a and 20b, any suitable electronic device that has the capability to output sound may be employed herein, such as a computer, tablet, radio, speaker, and/or smartphone. Furthermore, in some embodiments, televisions 20a and 20b may present similar content, such as a same television commercial. The content that is output by televisions 20a and 20b may, for example, correspond to a command 4a and 4b, respectively. Each of commands 4a and 4b may include an utterance of a wakeword, which may subsequently be followed by a question, statement, and/or request. Voice activated electronic devices 10a and 10 may, in turn, send audio data representing some or all of commands 4a and 4b, respectively, to backend system 100. Audio data, for instance may correspond to any suitable audio file format for storing digital audio data, such as uncompressed or compressed audio. Various types of uncompressed audio data may include, but are not limited to, WAV, AIFF, and the like. For compressed audio data, two different audio formats may be used: lossless or lossy compressed audio. Lossless compressed audio data may occupy less storage space, but without any information loss such that an uncompressed version of the original audio data may be recreated at a later time. Various types of lossless audio data may include, but are not limited to, ".wv" files, ALAC, MPEG-4 SLS, MPEG-4 ALS, MPEG-4 DST, and the like. Lossy compressed audio data may be of a smaller file size than lossless compressed audio data, and may have some audio information removed. Various types of lossy audio data may include, but are not limited to, MP3s, MP4s, and the like.

Voice activated electronic devices 10a and 10b may each detect a wakeword, such as "Alexa," or "Amazon," and may interpret subsequent user speech using one or more audio input devices (e.g., one or more microphones and/or transducers). For example, television 20a may present a commercial thereon, which includes command 4a, "Alexa—What is the traffic like?" In this particular scenario, voice activated electronic device 10a may detect the wakeword (e.g., "Alexa") and, in response, begin recording audio data of the question/statement (e.g., "What is the traffic like?"), to be sent to backend system 100. Similarly, television 20b may also present the same commercial thereon, which includes command 4b, "Alexa—What is the traffic like?" Voice activated electronic device 10b may detect the wakeword (e.g., "Alexa") and, in response, begin recording audio data of the question/statement (e.g., "What is the traffic like?"), to be sent to backend system 100.

A wakeword may be identified within an audio signal detected by one or more microphones located on voice activated electronic devices 10a and 10b, however persons of ordinary skill in the art will recognize that the one or more microphones may alternatively be located on a separate device in communication with voice activated electronic device 10a and 10b. In some embodiments, after the wakeword is detected, voice activated electronic devices 10a and 10b may begin interpreting/analyzing audio until no more audio (e.g., speech) is detected by the audio input device(s). In some embodiments, voice activated electronic devices 10a and 10b may capture audio for a pre-defined period of time after the wakeword is detected (e.g., 5 seconds, 10 seconds, 30 seconds, etc.). However, in other embodiments, voice activated electronic devices 10a and 10b may cyclically capture audio for pre-defined amounts of time (e.g., 5 seconds, 10 seconds, 15 seconds, etc.), and may delete that captured audio so long as the wakeword had not determined to be uttered in that particular time period.

Commands 4a and 4b may each include a wakeword followed by a question, statement, inquiry, and/or instruction, or other set of one or more words/sounds or phrase. For example, command 4a may be audio of the question, "Alexa—What is the traffic like?" However, alternative or additional commands may include, but are not limited to, "Alexa—What is the weather like today?", or "Alexa—How far away is the Moon?". In some embodiments, commands 4a and 4b may include multiple instances of a wakeword (e.g., "Alexa"), such as "Alexa—Simon says, 'My name is Alexa.' Alexa—What is the weather like?" In one nonlimiting embodiment, the wakeword's utterance within commands 4a and/or 4b may correspond to audio outputted by televisions 20a and/or 20b. For example, during a commercial played on television 20a, the commercial may include audio that says, "Alexa—What is the score?" This audio is, therefore, detectable by voice activated electronic device 10a as command 4a, which may be processed or ignored, depending on one or more additional characteristics, which are described in greater detail below. However, various other descriptive features corresponding to commands 4*a* and/or 4*b* being sent to backend system 100 for response determination, generation, and transmission back to voice activated electronic devices 10 and/or 10*b*, are also described herein.

In some embodiments, because each of voice activated electronic devices 10*a* and 10*b* are located proximate to a respective television 20*a* and 20*b*, voice activated electronic devices 10*a* and 10*b* may "hear" commands 4*a* and 4*b* emanating from televisions 20*a* and 20*b*, respectively. Thus, voice activated electronic devices 10*a* and 10*b* may detect an utterance of the wakeword "Alexa" within commands 4*a* and 4*b*, respectively, and then start capturing the subsequent audio from commands 4*a* and 4*b*, and may begin to package and sending the audio data representing commands 4*a* and 4*b* to backend system 100. The detection of the wakeword within commands 4*a* and 4*b* by voice activated electronic devices 10*a* and 10*b* may, therefore, occur at a substantially same time, or within a similar temporal window, as the commercial or other media event that outputted commands 4*a* and 4*b* across each of televisions 20*a* and 20*b* occurs at substantially the same time. Furthermore, voice activated electronic devices 10*a* and 10*b* may begin sending audio data representing command 4*a* and audio data representing command 4*b* to backend system 100 at substantially the same time. Additionally, one or more pieces of additional data, such as a time and/or date that commands 4*a* and/or 4*b* was said or detected by voice activated electronic devices 10*a* and 10*b*, respectively, a location of voice activated electronic devices 10*a* and 10*b*, respectively (e.g., a GPS location), an IP address associated with voice activated electronic devices 10*a* and 10*b*, respectively, a device type of voice activated electronic devices 10*a* and 10*b*, respectively, a customer or device identification number of voice activated electronic devices 10*a* and 10*b*, respectively, or any other information, or any combination, may be provided to backend system 100.

The audio data representing command 4*a* and the audio data representing command 4*b* may be transmitted over a network, such as the Internet, to backend system 100 using any number of communications protocols. For example, Transfer Control Protocol and Internet Protocol ("TCP/IP") (e.g., any of the protocols used in each of the TCP/IP layers), Hypertext Transfer Protocol ("HTTP"), and wireless application protocol ("WAP"), are some of the various types of protocols that may be used to facilitate communications between voice activated electronic devices 10*a* and 10*b*, and backend system 100. In some embodiments, voice activated electronic devices 10*a* and 10*b*, and backend system 100 may communicate with one another via a web browser using HTTP. Various additional communication protocols may be used to facilitate communications between voice activated electronic devices 10*a* and 10*b*, and backend system 100 including, but not limited to, Wi-Fi (e.g., 802.11 protocol), Bluetooth®, radio frequency systems (e.g., 900 MHz, 1.4 GHz, and 5.6 GHz communication systems), cellular networks (e.g., GSM, AMPS, GPRS, CDMA, EV-DO, EDGE, 3GSM, DECT, IS-136/TDMA, iDen, LTE or any other suitable cellular network protocol), infrared, BitTorrent, FTP, RTP, RTSP, SSH, and/or VOIP.

Backend system 100 may include one or more processors, databases, and/or servers, each in communication with one another and/or voice activated electronic devices 10*a* and 10*b*. Each processor, database, and/or server of backend system 100 may be capable of storing, retrieving, processing, analyzing, and/or generating data to be provided to voice activated electronic devices 10*a* and 10*b*, or to one or more additional devices. For example, backend system 100 may include one or more game servers for storing and processing information related to one or more different games (e.g., "Simon Says," karaoke, etc.). As another example, backend system 100 may include one or more weather servers for storing weather information and/or providing weather information to voice activated electronic devices 10*a* and 10*b*. Backend system 100 may, in some embodiments, correspond to a collection of servers located within a remote facility, and individuals may store data on backend system 100 and/or communicate with backend system 100 using one or more of the aforementioned communications protocols.

Upon receipt of the audio data representing some or all of command 4*a* and the audio data representing some or all of command 4*b*, backend system 100 may perform various actions based on, and in response to, commands 4*a* and 4*b*. For instance, backend system 100 may include automatic automated speech recognition processing that may convert the audio data representing command 4*a* and the audio data representing command 4*b* into text data, and may use that text data to determine one or more of the word(s) within commands 4*a* and 4*b*. Furthermore, backend system 100 may also include natural language understanding functionality for further processing and analyzing the text data representing command 4*a* and the text data representing command 4*b* to determine an intent of commands 4*a* and 4*b*. After the word(s) from the text data are determined, an appropriate subject matter server or servers (e.g., first party applications, third party applications, etc.) of backend system 100 may be accessed to retrieve or obtain a response, or response information, to command 4*a* and 4*b* from a specific subject matter server (or skill). Backend system 100 may also include one or more computing devices in communication with the one or more subject matter servers of backend system 100, which may include one or more processors, communication circuitry (including any circuitry capable of using any of the aforementioned communications protocols), and/or storage/memory. Backend system 100 may also include various modules that store software, hardware, logic, instructions, and/or commands for backend system 100 to perform, such as, for example, a speech-to-text ("STT") module and/or a text-to-speech ("TTS") module. A more detailed description of backend system 100 is provided below.

The text data representing command 4*a* and the text data representing command 4*b* may be analyzed to determine what command, action, or instruction is included therein. While techniques for transcribing speech into text are well known in the art and need not be described in further detail herein, any suitable computer implemented speech to text technique may be used to convert the received audio signal(s) into text, such as SOFTSOUND speech processing technologies available from the Autonomy Corporation, which is headquartered in Cambridge, England, United Kingdom. In some embodiments, one or more filters may be applied to the received audio data to reduce or minimize extraneous noise, however this is not required.

After the audio data is analyzed and a response to command 4*a* and a response to command 4*b* are generated, speech, such as a response or answer to commands 4*a* and 4*b*, may be generated and converted from text into responsive audio data representing the responses using text-to-speech ("TTS") techniques. While techniques for transcribing text into speech are well known in the art and need not be described in further detail herein, any suitable computer implemented text to speech technique may be used to convert the text into speech, such as SOFTSOUND speech processing technologies available from the Autonomy Corporation, which is headquartered in Cambridge, England, United Kingdom. Audio data representing the speech may then be transmitted back to voice activated electronic devices 10a and 10b, and the responses to commands 4a and 4b may then be outputted through one or more speakers on voice activated electronic devices 10a and 10b, respectively.

As presented within FIG. 1, voice activated electronic devices 10a and 10b may each send substantially the same audio data (e.g., first audio data representing command 4a and second audio data representing command 4b) to backend system 100 at substantially the same time, or within a small temporal window of one another. Therefore, backend system 100 may begin to process the substantially same audio data at substantially the same time. In some embodiments, backend system 100 may, in parallel to automated speech recognition processing, generate a sound profile, such as an audio fingerprint, of each audio data that is received. For example, a first audio fingerprint of first audio data representing command 4a and a second audio fingerprint of second audio data representing command 4b may be generated in parallel to automatic automated speech recognition processing being performed to the first audio data and the second audio data. In some embodiments, the first sound profile (e.g., first audio fingerprint) and the second sound profile (e.g., second audio fingerprint) may be compared to one another. If the two sound profiles are determined to be substantially similar (e.g., a similarity score of the two sound profile exceeds a similarity threshold value), then the two sound profiles may be said to represent the same speech (e.g., commands 4a and 4b). The likelihood of two completely separate voice activated electronic devices (e.g., voice activated electronic devices 10a and 10b) corresponding to two different user accounts (e.g., two different customer identification numbers) both being activated by the same command at the same time by two different humans uttering the same command with the same background noise is very small, and therefore the first audio and the second audio data received from voice activated electronic devices 10a and 10b are likely non-human in origin (e.g., a commercial, a movie, a television show, etc.). Thus, in response to determining that the two sound profiles are substantially similar, backend system 100 may store the sound profile within memory as corresponding to a non-human command, and may cause any remaining automated speech recognition processing for the first audio data and the second audio data to be stopped.

Backend system 100 may determine that two or more sound profiles corresponding to recently received audio data are substantially similar to one another, and therefore may determine that the received audio data are due to a non-human utterance being detected by a two or more corresponding voice activated electronic devices. In one illustrative, non-limiting embodiment, backend system 100 may perform process 150 thereon. Process 150 may begin at step 152. At step 152, first audio data and second audio data may be received by backend system 100. For example, first audio data representing command 4a may be sent by voice activated electronic device 10a to backend system 100 at a first time, and second audio data representing command 4b may be sent by voice activated electronic device 10b to backend system 100 at a second time. In this particular scenario, the first time and the second time may correspond to substantially the same time, or first and second times may both occur within a relatively small temporal window of one another (e.g., a few milliseconds). In some embodiments, first temporal metadata indicating the first time that the first audio data was sent and second temporal metadata indicating the second time that the second audio data was sent, may also be received with the first and second audio data. If a temporal difference between the first time and the second time is less than a temporal threshold value, then the first audio data and the second audio data may be said to have been sent at the same, or substantially the same, time. Furthermore, in some embodiments, first user account information indicating a first customer identification number of voice activated electronic device 10a, and second user account information indicating a second customer identification number of voice activated electronic device 10b, may also be received by backend system 100 along with the first and second audio data. A determination may be made as to whether or not, based on the first and second customer identification numbers, voice activated electronic devices 10a and 10b correspond to a same user account. If not, then backend system 100 may determine that the first audio data and the second audio data were received by two physically separated (e.g., from different households or residences) voice activated electronic devices.

After receipt of the first and second audio data, backend system 100 may generate a first sound profile of the first audio data, and backend system 100 may also generate a second sound profile of the second audio data, at step 154. For example, a sound profile generation module on backend system 100 may generate a first audio fingerprint of the first audio data representing command 4a, and the sound profile generation module may also generate a second audio fingerprint of the second audio data representing command 4b. In some embodiments, backend system 100 may include multiple sound profile generation modules, and the sound profiles generated by the multiple sound profile generation modules may be shared amongst one another, as described in greater detail below.

At step 156, a similarity value between the first sound profile and the second sound profile, indicating how similar the first and second sound profiles are to one another, may be determined. For example, a bit error rate between a first audio fingerprint of the first audio data, and a second audio fingerprint of the second audio data, may be determined. The bit error rate, as described herein, may be associated with a rate of making a false positive match between two audio fingerprints. A total bit error rate between two bitmasks may correspond to a number of different bits over a total number of bits, for example. For a given bit error rate threshold value $\alpha$ and number of bits $\beta$, the rate of making a false positive match may be:

$$P_f(\alpha) = \frac{1}{2} Erf\left(\frac{(1-2\alpha)}{3\sqrt{2}} \sqrt{\beta}\right).$$  Equation 1

In Equation 1, $Erf$ corresponds to the Error function. As an illustrative example, for a bit error rate threshold value $\alpha=35\%$, $\beta=256$ frames multiplied by 32 bits/frame, the false positive rate $P_f=3.6\times10^{-20}$. An audio fingerprint, in one exemplary embodiment, may be determined by calculating a bitmask F of a sign of a temporal difference between audio frames of a frequency difference within those frames. For example, for a given frequency bin, m, and audio frame n, a fingerprint bit may be determined by, first, calculating a first difference between a frequency bin energy E for the given frequency bin and audio frame and a frequency bin energy for the same audio frame but next frequency bin, as described by Equation 2.

$$F(n, m) = \begin{cases} 1 & \text{if } \Delta_t(n, m) > 0 \\ 0 & \text{if } \Delta_t(n, m) \geq 0 \end{cases}. \quad \text{Equation 2}$$

In Equation 2, $\Delta_t(n, m) = \Delta_f(n, m) - \beta_f(n-1, m)$, and $\Delta_f(n, m) = E(n, m) - E(n, m+1)$. After the first difference is calculated, a total difference between the first difference and a second difference may be calculated, where the second difference corresponds to a difference in the frequency bin energy for the given frequency bin and audio frame and a frequency bin energy for a previous audio frame and same frequency bin. For a 32-bit per frame audio signal, there may be 33 frequency bins, for instance. An audio frame, for example, may correspond to a segmented portion of an audio sample. In one illustrative embodiment, the audio data, upon receipt, may be segmented into overlapping audio frames of approximate 380 milliseconds, however any suitable frame width may be employed.

At step 158, a determination may be made as to whether or not the similarity value is greater than a predefined similarity threshold value. If, for instance, the similarity value determined at step 156 is less than or equal to the similarity threshold value, then process 150 may proceed to step 164, where automated speech recognition processing may continue for the first audio data and the second audio data. In one embodiment, if the similarity value is determined to be less than the similarity threshold value, this may indicate that the first audio data and the second audio data differ from one another, and therefore automated speech recognition processing, such as text data generation, may proceed. However, if the similarity value is determined to be greater than the similarity threshold value, then process 150 may proceed to step 160.

At step 160, backend system 100 may cause automated speech recognition processing to be stopped for the first audio data and the second audio data. For example, in parallel to process 150, an automatic speech recognition module may be beginning the process of generating first text data representing the first audio data as well as generating second text data representing the second audio data. Thus, at step 160, backend system 100 may cause the automatic speech recognition module to stop the process of generating the first and second text data, as well as also instructing the automatic speech recognition module to discard any text data that may have already been generated.

At step 162, the first sound profile and/or the second sound profile may be stored in memory on backend system 100. For example, the first and/or second sound profile may be stored as a flagged or blacklisted sound profile within a sound profile database on backend system 100. By storing the first and/or second sound profile(s) as flagged sound profiles, backend system 100 may be able to determine whether any additional audio data received by backend system 100 matches the flagged sound profile. If so, the additional audio data would likely also correspond to another instance of the same media event that included commands 4a and 4b triggering an additional voice activated electronic device.

In some embodiments, backend system 100 may also generate an instruction for voice activated electronic devices 10a and 10b to each return to a keyword spotting mode where voice activated electronic devices 10a and 10b are actively monitoring all sound signals received from one or more microphones of voice activated electronic devices 10a and 10b for a wakeword by continuously running through a wakeword engine, and may send the instruction to both voice activated electronic devices 10a and 10b. For example, both commands 4a and 4b may likely emanate from a non-human source, such as a media event, and therefore backend system 100 may not generate a response to commands 4a and 4b. Instead, backend system 100 may ignore commands 4a and 4b, and may generate and send an instruction to voice activated electronic devices 10a and 10b that causes voice activated electronic devices 10a and 10b to return to a keyword spotting mode.

Figure 2:
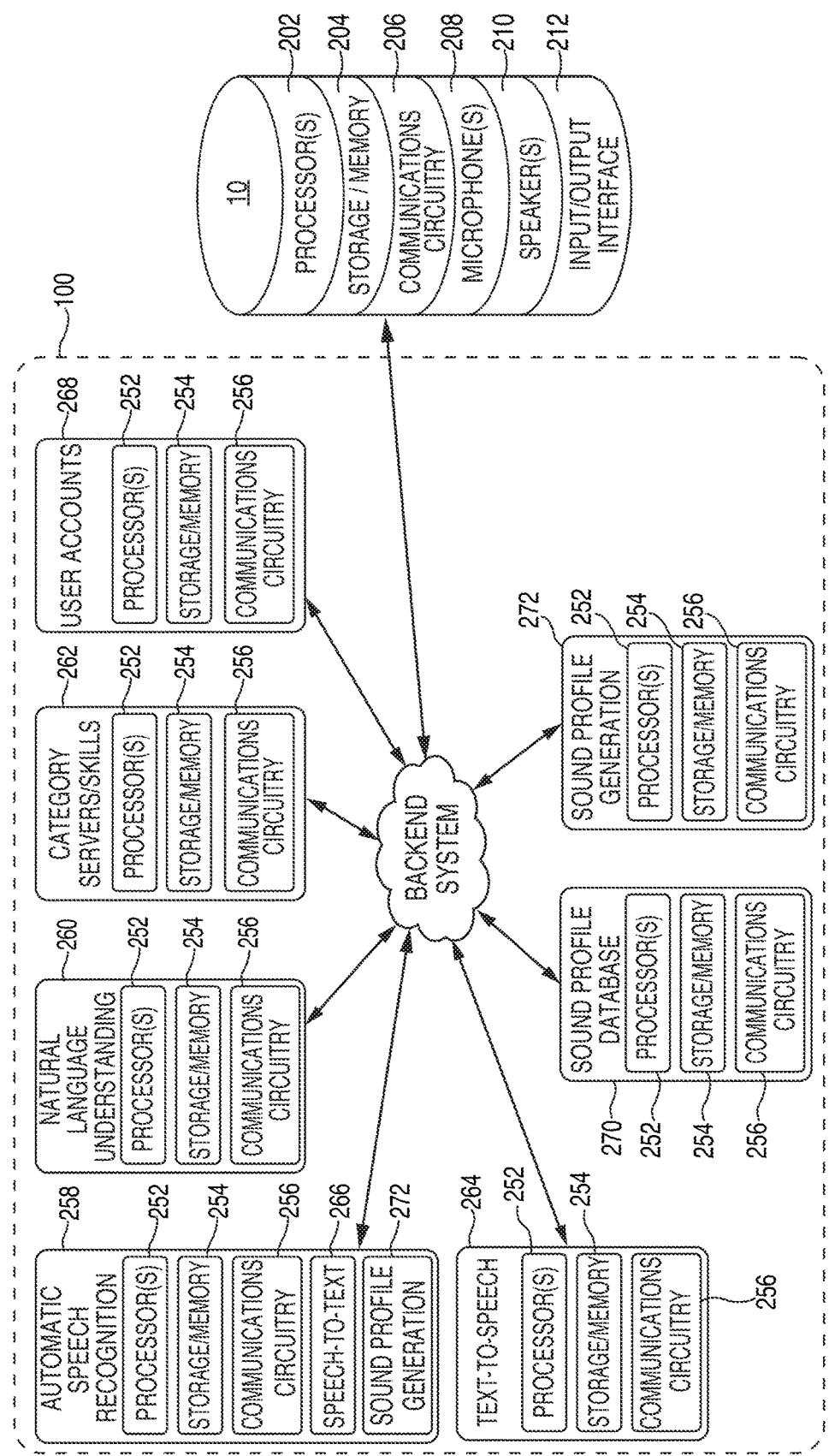
FIG. 2 is an illustrative diagram of a portion of the system architecture of FIG. 1, in accordance with various embodiments.

FIG. 2 is an illustrative diagram of a portion of the system architecture of FIG. 1, in accordance with various embodiments. Voice activated electronic devices 10a and 10b, which collectively may be referred to as voice activated electronic device(s) 10, in some embodiments, may correspond to any type of electronic device capable of being activated in response to detecting a specific sound, such as a wakeword or trigger. In some embodiments, the specific sound may emanate from an additional electronic device, such as a television or radio, or the specific sound may be uttered by an individual. After detecting the specific sound (e.g., a wakeword or trigger), voice activated electronic device(s) 10 may, in some embodiments, recognize commands (e.g., audible commands, inputs) within captured audio subsequently following the specific sound, and may perform one or more actions in response to the received commands. Voice activated electronic device 10 may correspond to any suitable type of electronic device including, but not limited to, desktop computers, mobile computers (e.g., laptops, ultrabooks), mobile phones, smart phones, tablets, televisions, set top boxes, smart televisions, watches, bracelets, display screens, personal digital assistants ("PDAs"), smart furniture, smart household devices, smart vehicles, smart transportation devices, and/or smart accessories. In some embodiments, voice activated electronic device 10 may be relatively simple or basic in structure such that no mechanical input option(s) (e.g., keyboard, mouse, track pad) or touch input(s) (e.g., touchscreen, buttons) may be provided. For example, voice activated electronic devices 10a and 10b of FIG. 1 may be able to receive and output audio, and may include power, processing capabilities, storage/memory capabilities, and communication capabilities.

Voice activated electronic device 10 may include a minimal number of input mechanisms, such as a power on/off switch, however primary functionality, in one embodiment, of voice activated electronic device 10 may solely be through audio input and audio output. For example, voice activated electronic device 10 may listen for a wakeword by continually monitoring local audio. In response to the wakeword being detected, voice activated electronic device 10 may establish a connection with backend system 100, send audio data to backend system 100, and await/receive a response from backend system 100. In some embodiments, however, non-voice activated electronic devices may also communicate with backend system 100 (e.g., push-to-talk devices, sound activated electronic devices).

Voice activated electronic device 10 may include one or more processors 202, storage/memory 204, communications circuitry 206, one or more microphones 208 or other audio input devices (e.g., transducers), one or more speakers 210 or other audio output devices, as well as an optional input/output ("I/O") interface 212. However, one or more additional components may be included within voice activated electronic device 10, and/or one or more components may be omitted. For example, voice activated electronic device 10 may include a power supply or a bus connector. As another example, voice activated electronic device 10 may not include an I/O interface (e.g., I/O interface 212). Furthermore, while multiple instances of one or more components may be included within voice activated electronic device 10, for simplicity only one of each component has been shown.

In some embodiments, device 10 of FIG. 2 may correspond to a manually activated electronic device. A manually activated electronic device, as described herein, may correspond to a device that is capable of being activated in response to a manual input from an individual (e.g., pressing a button, touching a portion of a touch screen, performing an action on a device). For example, a tap-to-talk electronic device is one type of manually activated electronic device. Such tap-to-talk electronic devices, for instance, are capable of obtaining and outputting audio data in response to a button being pressed by an individual.

Processor(s) 202 may include any suitable processing circuitry capable of controlling operations and functionality of voice activated electronic device 10, as well as facilitating communications between various components within voice activated electronic device 10. In some embodiments, processor(s) 202 may include a central processing unit ("CPU"), a graphic processing unit ("GPU"), one or more microprocessors, a digital signal processor, or any other type of processor, or any combination thereof. In some embodiments, the functionality of processor(s) 202 may be performed by one or more hardware logic components including, but not limited to, field-programmable gate arrays ("FPGA"), application specific integrated circuits ("ASICs"), application-specific standard products ("ASSPs"), system-on-chip systems ("SOCs"), and/or complex programmable logic devices ("CPLDs"). Furthermore, each of processor(s) 202 may include its own local memory, which may store program modules, program data, and/or one or more operating systems. However, processor(s) 202 may run an operating system ("OS") for voice activated electronic device 10, and/or one or more firmware applications, media applications, and/or applications resident thereon.

Storage/memory 204 may include one or more types of storage mediums such as any volatile or non-volatile memory, or any removable or non-removable memory implemented in any suitable manner to store data on voice activated electronic device 10. For example, information may be stored using computer-readable instructions, data structures, and/or program modules. Various types of storage/memory may include, but are not limited to, hard drives, solid state drives, flash memory, permanent memory (e.g., ROM), electronically erasable programmable read-only memory ("EEPROM"), CD-ROM, digital versatile disk ("DVD") or other optical storage medium, magnetic cassettes, magnetic tape, magnetic disk storage or other magnetic storage devices, RAID storage systems, or any other storage type, or any combination thereof. Furthermore, storage/memory 204 may be implemented as computer-readable storage media ("CRSM"), which may be any available physical media accessible by processor(s) 202 to execute one or more instructions stored within storage/memory 204. In some embodiments, one or more applications (e.g., gaming, music, video, calendars, lists, etc.) may be run by processor(s) 202, and may be stored in memory 204.

In some embodiments, storage/memory 204 may include one or more modules and/or databases, such as a speech recognition module, a wakeword database, a sound profile database, and a wakeword detection module. The speech recognition module may, for example, include an automatic speech recognition ("ASR") component that recognizes human speech in detected audio. The speech recognition module may also include a natural language understanding ("NLU") component that determines user intent based on the detected audio. Also included within the speech recognition module may be a text-to-speech ("TTS") component capable of converting text to speech to be outputted by speaker(s) 210, and/or a speech-to-text ("STT") component capable of converting received audio signals into text to be sent to backend system 100 for processing.

The wakeword database may be a database stored locally on voice activated electronic device 10 that includes a list of a current wakeword for voice activated electronic device 10, as well as one or more previously used, or alternative, wakewords for voice activated electronic device. In some embodiments, an individual may set or program a wakeword for their voice activated electronic device 10. The wakeword may be programmed directly on voice activated electronic device 10, or a wakeword or words may be set by the individual via a backend system application that is in communication with backend system 100. For example, an individual may use their mobile device having the backend system application running thereon to set the wakeword. The specific wakeword may then be communicated from the mobile device to backend system 100, which in turn may send/notify voice activated electronic device 10 of the individual's selection for the wakeword. The selected activation may then be stored in the wakeword database of storage/memory 204. In some embodiments, additional trigger expressions or permutations of the wakeword may also be stored within storage/memory 204. For example, specific trigger expressions or words that indicate the presence of the wakeword may also be stored within storage/memory 204. In some embodiments, audio watermarks, indicating a specific action or message, may also be stored within storage/memory 204.

In some embodiments, sound profiles for different words, phrases, commands, or audio compositions are also capable of being stored within storage/memory 204, such as within a sound profile database. For example, a sound profile of audio may be stored within the sound profile database of storage/memory 204 on voice activated electronic device 10. In this way, if a particular sound (e.g., a wakeword or phrase) is detected by voice activated electronic device 10, a corresponding command or request may be ignored, for example. A sound profile, for example, may correspond to a frequency and temporal decomposition of a particular audio file or audio portion of any media file, such as an audio fingerprint or spectral representation.

The wakeword detection module may include an expression detector that analyzes an audio signal produced by microphone(s) 208 to detect a wakeword, which generally may be a predefined word, phrase, or any other sound, or any series of temporally related sounds. Such an expression detector may be implemented using keyword spotting technology, as an example. A keyword spotter is a functional component or algorithm that evaluates an audio signal to detect the presence of a predefined word or expression within the audio signal detected by microphone(s) 208. Rather than producing a transcription of words of the speech, a keyword spotter generates a true/false output (e.g., a logical I/O) to indicate whether or not the predefined word or expression was represented in the audio signal. In some embodiments, an expression detector may be configured to analyze the audio signal to produce a score indicating a likelihood that the wakeword is represented within the audio signal detected by microphone(s) 208. The expression detector may then compare that score to a wakeword threshold to determine whether the wakeword will be declared as having been spoken.

In some embodiments, a keyword spotter may use simplified ASR techniques. For example, an expression detector may use a Hidden Markov Model ("HMM") recognizer that performs acoustic modeling of the audio signal and compares the HMM model of the audio signal to one or more reference HMM models that have been created by training for specific trigger expressions. An MINI model represents a word as a series of states. Generally, a portion of an audio signal is analyzed by comparing its MINI model to an HMM model of the trigger expression, yielding a feature score that represents the similarity of the audio signal model to the trigger expression model.

In practice, an HMM recognizer may produce multiple feature scores, corresponding to different features of the HMM models. An expression detector may use a support vector machine ("SVM") classifier that receives the one or more feature scores produced by the HMM recognizer. The SVM classifier produces a confidence score indicating the likelihood that an audio signal contains the trigger expression. The confidence score is compared to a confidence threshold to make a final decision regarding whether a particular portion of the audio signal represents an utterance of the trigger expression (e.g., wakeword). Upon declaring that the audio signal represents an utterance of the trigger expression, voice activated electronic device 10 may then begin transmitting the audio signal to backend system 100 for detecting and responds to subsequent utterances made by an individual or by an electronic device (e.g., television 20).

Communications circuitry 206 may include any circuitry allowing or enabling voice activated electronic device 10 to communicate with one or more devices, servers, and/or systems. For example, communications circuitry 206 may facilitate communications between voice activated electronic device 10 and backend system 100. Communications circuitry 206 may use any communications protocol, such as any of the previously mentioned exemplary communications protocols. In some embodiments, voice activated electronic device 10 may include an antenna to facilitate wireless communications with a network using various wireless technologies (e.g., Wi-Fi, Bluetooth®, radiofrequency, etc.). In yet another embodiment, voice activated electronic device 10 may include one or more universal serial bus ("USB") ports, one or more Ethernet or broadband ports, and/or any other type of hardwire access port so that communications circuitry 206 allows voice activated electronic device 10 to communicate with one or more communications networks.

Voice activated electronic device 10 may also include one or more microphones 208 and/or transducers. Microphone(s) 208 may be any suitable component capable of detecting audio signals. For example, microphone(s) 208 may include one or more sensors for generating electrical signals and circuitry capable of processing the generated electrical signals. In some embodiments, microphone(s) 208 may include multiple microphones capable of detecting various frequency levels. As an illustrative example, voice activated electronic device 10 may include multiple microphones (e.g., four, seven, ten, etc.) placed at various positions about voice activated electronic device 10 to monitor/capture any audio outputted in the environment where voice activated electronic device 10 is located. The various microphones 208 may include some microphones optimized for distant sounds, while some microphones may be optimized for sounds occurring within a close range of voice activated electronic device 10. In some embodiments, microphone(s) 208 may only begin to detect audio signals in response to a manual input to device 10. For example, a manually activated electronic device may begin to capture audio data in response to a user input, such as pressing a button, tapping a touch screen, or providing any touch input gesture to a touch input component.

Voice activated electronic device 10 may further include one or more speakers 210. Speaker(s) 210 may correspond to any suitable mechanism for outputting audio signals. For example, speaker(s) 210 may include one or more speaker units, transducers, arrays of speakers, and/or arrays of transducers that may be capable of broadcasting audio signals and or audio content to a surrounding area where voice activated electronic device 10 may be located. In some embodiments, speaker(s) 210 may include headphones or ear buds, which may be wirelessly wired, or hard-wired, to voice activated electronic device 10, that may be capable of broadcasting audio directly to an individual.

In some embodiments, one or more microphones 208 may serve as input devices to receive audio inputs, such as command 4 from television 20. Voice activated electronic device 10, in the previously mentioned embodiment, may then also include one or more speakers 210 to output audible responses. In this manner, voice activated electronic device 10 may function solely through speech or audio, without the use or need for any input mechanisms or displays.

In one exemplary embodiment, voice activated electronic device 10 includes I/O interface 212. The input portion of I/O interface 212 may correspond to any suitable mechanism for receiving inputs from a user of voice activated electronic device 10. For example, a camera, keyboard, mouse, joystick, or external controller may be used as an input mechanism for I/O interface 212. The output portion of I/O interface 212 may correspond to any suitable mechanism for generating outputs from electronic device 10. For example, one or more displays may be used as an output mechanism for I/O interface 212. As another example, one or more lights, light emitting diodes ("LEDs"), or other visual indicator(s) may be used to output signals via I/O interface 212 of voice activated electronic device 10. In some embodiments, one or more vibrating mechanisms or other haptic features may be included with I/O interface 212 to provide a haptic response to an individual from device 10. Persons of ordinary skill in the art will recognize that, in some embodiments, one or more features of I/O interface 212 may be included in a purely voice activated version of electronic device 10. For example, one or more LED lights may be included on voice activated electronic device 10 such that, when microphone(s) 208 receive audio, the one or more LED lights become illuminated signifying that audio has been received by voice activated electronic device 10. In some embodiments, I/O interface 212 may include a display screen and/or touch screen, which may be any size and/or shape and may be located at any portion of voice activated electronic device 10. Various types of displays may include, but are not limited to, liquid crystal displays ("LCD"), monochrome displays, color graphics adapter ("CGA") displays, enhanced graphics adapter ("EGA") displays, variable graphics array ("VGA") display, or any other type of display, or any combination thereof. Still further, a touch screen may, in some embodiments, correspond to a display screen including capacitive sensing panels capable of recognizing touch inputs thereon.

Backend system 100 may include various components and modules including, but not limited to, automatic speech recognition ("ASR") module 258, natural language understanding ("NLU") module 260, subject matter servers/skills module 262, text-to-speech ("TTS") module 264, user accounts module 268, sound profile database 270, and sound profile generation module 272. In some embodiments, backend system 100 may also include computer readable media, including, but not limited to, flash memory, random access memory ("RAM"), and/or read-only memory ("ROM"). Backend system 100 may also include various modules that store software, hardware, logic, instructions, and/or commands for backend system 100, such as a speaker identification ("ID") module, or any other module, or any combination thereof.

ASR module 258 may be configured to recognize human speech in detected audio, such as audio captured by voice activated electronic device 10, which may then be transmitted to backend system 100. ASR module 258 may include, in one embodiment, one or more processor(s) 252, storage/memory 254, and communications circuitry 256. Processor(s) 252, storage/memory 254, and communications circuitry 256 may, in some embodiments, be substantially similar to processor(s) 202, storage/memory 204, and communications circuitry 206, which are described in greater detail above, and the aforementioned descriptions may apply. In some embodiments, ASR module 258 may include speech-to-text ("STT") module 266. STT module 266 may employ various speech-to-text techniques. However, techniques for transcribing speech into text are well known in the art and need not be described in further detail herein, and any suitable computer implemented speech to text technique may be used to convert the received audio signal(s) into text, such as SOFTSOUND speech processing technologies available from the Autonomy Corporation, which is headquartered in Cambridge, England, United Kingdom.

ASR module 258 may include an expression detector that analyzes audio signals received by backend system 100, such as the expression detector mentioned above with regards to voice activated electronic device 10. Such an expression detector may be implemented using keyword spotting technology, as an example. A keyword spotter is a functional component or algorithm that evaluates an audio signal to detect the presence of a predefined word or expression, such as a passphrase or other sound data, within the audio signals. Rather than producing a transcription of words of the speech, a keyword spotter generates a true/false output (e.g., a logical I/O) to indicate whether or not the predefined word or expression was represented in the audio signal. In some embodiments, an expression detector may be configured to analyze the audio signal to produce a score indicating a likelihood that the wakeword or phrase, is represented within the audio signal. The expression detector may then compare that score to a threshold value to determine whether the wakeword or phrase will be declared as having been spoken.

In some embodiments, ASR module 258 may include one or more instances of a sound profile generation module 272, which may be used to generate a sound profile, such as an audio fingerprint, of a specific audio signal or sound. For example, a media event, such as a commercial, which may include an utterance of the wakeword (e.g., "Alexa") of voice activated electronic device 10, and a sound profile of the audio of that commercial may be generated using sound profile generation module 272. In some embodiments, STT module 266 and sound profile generation module 272 may operate in parallel within ASR module 258. For example, upon receipt of audio data representing speech, a copy of the audio data may be generated by ASR module 258, and the copy of the audio data may be provided to STT module 268, while the original may be provided to sound profile generation module 272. As another example, the copy of the audio data may be provided to sound profile generation module 272, while the original may be provided to STT module 266. As yet another example, two copies may be generated by ASR module 258 such that one copy goes to STT module 266 and one copy goes to sound profile generation module 272. However, persons of ordinary skill in the art will recognize that any version of the audio data may be provided to either of STT module 266 and sound profile generation module 272, and the aforementioned are merely exemplary.

The generated sound profile may then be provided to, and stored within, sound profile database 270. This may enable backend system 100 to prevent any future occurrences of the media event from erroneously triggering voice activated electronic device and/or causing unwanted speech processing to occur from audio emanating from the media event. In some embodiments, as described in greater detail below, a sound profile may be generated for a common audio signal received by multiple voice activated electronic devices 10 at a substantially same time.

In some embodiments, another instance of sound profile generation module 272 may be located external to ASR module 258. For example, one or more sound profile generation modules 272 may be located on backend system 100. In this particular scenario, each sound profile generation module may store a certain number of sound profiles, such as sound profiles of recently received audio data. In one illustrative embodiment, backend system 100 may include N sound profile generation modules 272, and each sound profile generation module 272 may store a certain number of sound profiles. For instance, if M sound profiles corresponding to the M most recently received audio data, each sound profile generation module 272 will store K=M/N sound profiles thereon. Therefore, in this example, a first sound profile generation module 272 may store a first K sound profiles, and then the next K sound profiles (e.g., sound profile K+1 to sound profile 2K) may be stored in a second sound profile generation module 272, and so on until all M sound profiles are stored across the N sound profile generation modules 272. However, in some embodiments, a first K sound profiles may be stored on a first sound profile generation module 272, while a next K, or however many sound profiles are left of the M sound profiles, may be stored on a second sound profile generation module 272, and so on. Therefore, not all of the M sound profiles may be stored across all of the N sound profile generation modules 272, and a load balancer may be included within backend system 100 that is configured to place a maximum number of sound profiles within a minimal number of sound profile generation modules 272. By doing this, a greatest likelihood of a single sound profile generation module 272 including two or more similar sound profiles may occur.

NLU module 260 may be configured such that it determines user intent based on the received audio data. For example, NLU module 260 may determine that the intent of command 4 is for traffic information. In response to determining the intent of command 4, NLU module 260 may communicate the received command to an appropriate subject matter server or skill on subject matter servers/skills module 262 to perform one or more tasks, and/or retrieve an appropriate response or response information. NLU module 260 may include processor(s) 252, storage/memory 254, and communications circuitry 256 which, in one embodiment, may be substantially similar to processor(s) 202, storage/memory 204, and communications circuitry 206 of electronic device 200, and the previous description may apply.

Subject matter servers/skills module 262 may, for example, correspond to various action specific skills or servers capable of processing various task specific actions. Subject matter servers/skills module 262 may further correspond to first party applications and/or third party applications capable of performing various tasks or actions. For example, based on the context of the audio received from voice activated electronic device 10, backend system 100 may use a certain application to generate a response, or to obtain response information, which in turn may be communicated back to voice activated electronic device 10. For instance, command 4 may ask for the traffic information, and therefore subject matter servers/skills module 262 may access a traffic subject matter server to obtain current traffic patterns and traffic information for a location associated with voice activated electronic device 10. Subject matter servers/skills module 262 may also include processor(s) 252, storage/memory 254, and communications circuitry 256.

TTS module 264 may employ various text-to-speech techniques. However, techniques for transcribing speech into text are well known in the art and need not be described in further detail herein, any suitable computer implemented speech to text technique may be used to convert the received audio signal(s) into text, such as SOFTSOUND speech processing technologies available from the Autonomy Corporation, which is headquartered in Cambridge, England, United Kingdom. TTS module 264 may also include processor(s) 252, storage/memory 254, and communications circuitry 256.

User accounts module 268 may store one or more user profiles corresponding to users having a registered account on backend system 100. For example, a parent may have a registered account on backend system 100, and each of the parent's children may have their own user profile registered under the parent's registered account. Information, settings, and/or preferences, for example, for each user profile may be stored within a user profile database. In some embodiments, user accounts module 268 may store a voice signal, such as voice biometric information, for a specific user profile. This may allow speaker identification techniques to be used to match a voice to voice biometric data associated with a specific user profile. In some embodiments, user accounts module 268 may store a telephone number assigned to a particular user profile. In some embodiments, in addition to receiving audio data from voice activated electronic device 10, backend system 100 may also receive user account information. For example, a customer identification number of voice activated electronic device 10 may be sent to backend system 100 with the audio data. Backend system 100 may, upon receipt of the user account information, determine an user account associated of voice activated electronic device 10. If, for example, two voice activated electronic devices (e.g., voice activated electronic devices 10a and 10b) both send audio data to backend system 100, a determination may be made as to whether or not those two voice activated electronic devices correspond to a same household or residence. User accounts module 268 may store each device associated with a particular user account. Thus, if two voice activated electronic devices each send audio data to backend system 100, then their customer identification numbers, for instance, will indicate that the two devices correspond to different user accounts, and therefore likely are located at two separate households.

Sound profile database 270 may store sound profiles corresponding to various words, phrases, or sounds. In some embodiments, certain sound profiles, if determined to be present within received audio data, may cause a specific action to occur. For example, a sound profile may be stored within sound profile database 270 of a word or phrase that, when detected, may indicate to backend system 100 that a corresponding command is to be ignored. A sound profile for a word or phrase may, in one embodiment, correspond to a spectrogram breakdown of that word or phrase, which indicates, for a finite time interval, an amplitude or intensity of each frequency within that word or phrase. For each maximum intensity level, a simplified two-dimensional spectrogram may be created that plots an intensity value for various temporal and frequency values. To index these points, one or more points within the spectrogram are mapped to one another using hashes. Anchor points within the spectrogram are selected, and the aggregate of the frequency with which the anchor point is located, the frequency of which a target point is located, a temporal difference between the target zone point and the anchor point, and a time of anchor point, may be found. Thus, each hash is stored within the sound profile database for a particular word or phrase's sound profile.

When audio data is received from voice activated electronic device 10, a sound profile of the audio data may be generated, and a similarity value may also be generated between the generated sound profile and one or more sound profiles of the words or phrases stored within storage/memory 254 of sound profile database 270. For example, flagged or blacklisted sound profiles corresponding to audio data representing commands that are to be ignored, may be stored within sound profile database 270. If the generated similarity value is greater than a similarity threshold value, then the two sound profiles may be said to be similar, and sound profile database 270 may provide an instruction to ASR module 258 to stop any remaining speech recognition processing, or to prevent any further analysis or processing of the audio data to occur.

Although sound profile database 270 is shown as a separate component within backend system 100, persons of ordinary skill in the art will recognize that this is merely exemplary. For example, sound profile database 270, or the functionality of sound profile database 270, may additionally or alternatively be included within ASR module 258 (e.g., within storage/memory 254 of ASR module 258). As another example, sound profile database 270, or the functionality of sound profile database 270, may be implemented within any other suitable component on backend system 100. Still further, in one exemplary embodiment, sound profile database 270, and/or the functionality thereof, may be included on voice activated electronic device 10 (e.g., within storage/memory 204), as described in greater detail above. As yet another example, sound profile database 270 may be included as a separate component external to both backend system 100 and voice activated electronic device 10. In this particular scenario, sound profile database 270 may perform one or more pre-filtering functions for audio content prior to the audio data being provided from voice activated electronic device 10 to backend system 100. Furthermore, sound profile database 270 may also include processor(s) 252, storage/memory 254, and communications circuitry 256.

Persons of ordinary skill in the art will recognize that although each of ASR module 258, NLU module 260, subject matter/skills module 262, TTS module 264, user accounts module 268, sound profile database 270, and sound profile generation module 272 may each include instances of processor(s) 252, storage/memory 254, and communications circuitry 256, and those instances of processor(s) 252, storage/memory 254, and communications circuitry 256 within each of ASR module 258, NLU module 260, subject matter servers/skills module 262, TTS module 264, user accounts module 268, sound profile database 270, and sound profile generation module 272 may differ. For example, the structure, functionality, and style of processor(s) 252 within ASR module 258 may be substantially similar to the structure, functionality, and style of processor(s) 252 within NLU module 260, however the actual processor(s) 252 need not be the same entity.

Figure 3:
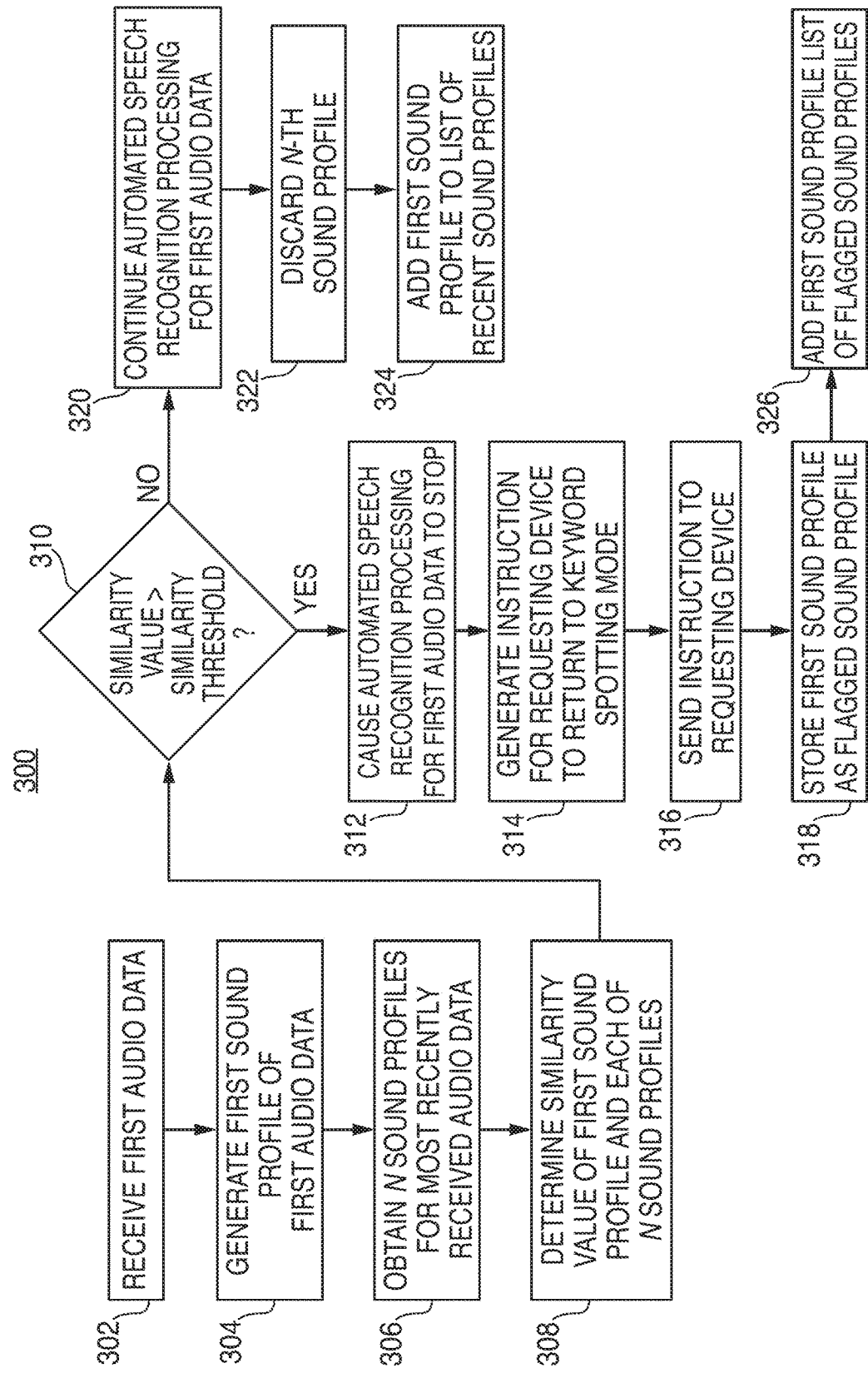
FIG. 3 is an illustrative flowchart of a process for determining that a sound profile of received audio data matches another sound profile of recently received audio data, in accordance with various embodiments.

FIG. 3 is an illustrative flowchart of a process for determining that a sound profile of received audio data matches another sound profile of recently received audio data, in accordance with various embodiments. Process 300, in some embodiments, may begin at step 302. At step 302, first audio data may be received by backend system 100. For example, in response to detecting an utterance of the wakeword, "Alexa," within a television commercial output from television 20a, voice activated electronic device 10a may begin recording the subsequent speech uttered after the wakeword (e.g., "What is the traffic like?"), and may send that audio data representing command 4a to backend system 100 using any of the aforementioned communications protocols. However, in some embodiments, the audio data sent to backend system 100 may include both the wakeword and the subsequent speech (e.g., "Alexa—What is the traffic like?"). Additionally, in some embodiments, backend system 100 may also receive, along with the audio data, temporal metadata (e.g., a timestamp) and/or user account information (e.g., a customer identification number). For example, voice activated electronic device 10 may send a timestamp indicating a time that the audio data representing command 4a was sent from voice activated electronic device 10a to backend system 100. As another example, a customer identification number associated with voice activated electronic device 10a may also be sent to backend system 100 with the audio data representing command 4a.

At step 304, a first sound profile of the first audio data may be generated by sound profile generation module 272. In some embodiments, upon receipt by backend system 100, a copy of the first audio data may be generated, and that copy may be provided to sound profile generation module 272 for generating the first sound profile. The original version of the first audio data may then be provided to ASR module 258 such that the process of generating text data representing the first audio data may begin. This, however, is merely exemplary, as the copy of the first audio data may alternatively be provided to ASR module 258 for text data generation, while the original version of the first audio data may be used by sound profile generation module 272 for generating the first sound profile. Further still, multiple copies of the audio data may be generated such that both ASR module 258 and sound profile generation module 272 may receive one of the copies.

At step 306, N sound profiles corresponding to an N most recently received audio data may be obtained. Each time that audio data is received by backend system 100, a sound profile of that audio data may be generated and stored within memory 254 of ASR module 258, sound profile database 270, and/or sound profile generation module 272. The N sound profiles may then be stored in a queue or list of recent sound profiles. In some embodiments, the list of recent sound profiles may be dynamic in that each time a new sound profile is generated for newly received audio data, a sound profile corresponding to an "oldest" or least recent audio data may be removed from the list. For example, there may be 100 sound profiles stored in the list of recent sound profiles. The first sound profile may correspond to audio data received at time t1 and the one hundredth sound profile corresponds to audio data received at time t2, where time t2 occurs after time t1. If new audio data is received at time t3, which is later than time t2, then the first sound profile may be removed from the list, and the one hundredth sound profile may become the ninety-ninth sound profile, and a new sound profile of the new audio data may become the one hundredth sound profile of the list.

In some embodiments, there may be two lists of sound profiles stored within memory 254 of ASR module 258, sound profile database 270, and/or sound profile generation module 272. A first list may correspond to a list of sound profiles of the N most recently received audio data, as described above. The second list may correspond to a list of flagged sound profiles. A flagged sound profile, in the exemplary embodiment, may correspond to a sound profile of a known sound or speech that backend system 100 is to ignore. For example, a known media event may include an utterance of the wakeword, "Alexa." If the wakeword from the known media event is detected within audio data received by backend system 100, then that command subsequently following that utterance of the wakeword should be ignored so that backend system 100 does not provide a response. As an illustrative example, a television commercial playing on television 20a may activate voice activated electronic device 10a due to the utterance of the wakeword during the television commercial. After sending audio data to backend system 100 representing the speech (e.g., the audio from the television commercial subsequently following the wakeword's utterance), a sound profile of that audio data may be generated. The generated sound profile may then be compared with an already known and flagged sound profile of the television commercial's audio. If the two sound profiles are determined to be similar, then the audio data of the generated sound profile may be ignored. The list of flagged sound profiles may include any number of flagged sound profiles, and each may have the same, or substantially the same, result in that, if they are detected, backend system 100 causes the corresponding audio data to be ignored. In some embodiments, upon generation, a sound profile may be compared with the flagged sound profiles on the second list (e.g., list of flagged sound profiles) prior to being compared with the sound profiles on the first list (e.g., list of recent sound profiles), however this is merely exemplary.

At step 308, a similarity value for each of the N sound profiles in the list, as compared with the generated sound profile, may be determined. In some embodiments, N similarity values may then be determined—one for each of the N sound profiles in the list as compared with the generated sound profile. For example, an audio fingerprint of the audio data representing command 4a may be generated. A bit error rate difference of the audio fingerprint and each audio fingerprint of corresponding to a 100 most recently received audio data may then be determined. Thus, 100 separate bit error rate differences may be determined that each indicate a difference between bits (e.g., "1"-bits, "0"-bits) of the audio fingerprint and each of the 100 audio fingerprints.

At step 310, a determination may be made as to whether any of the N similarity values exceeds a similarity threshold value, which indicates whether the two sound profiles may be declared as being the same or matching. The similarity threshold value may, in some embodiments, be set by an individual operating voice activated electronic devices 10a or 10b, or may be set by an individual having a user account within user accounts module 268 on backend system 100. In some embodiments, there may be more than one similarity threshold value: a first similarity threshold value for flagged sound profiles and a second similarity threshold value for the N sound profiles of the list. The first similarity threshold value may be set greater than, less than, or equal to, the second similarity threshold value. For example, the second similarity threshold value may be set at 90% similarity (e.g., only a 10% bit error rate difference) indicating that if the generated sound profile and one of the N sound profiles are greater than 90% similar, then two sound profiles originate from the same source. Continuing this example, the first similarity threshold value may be set lower, such as at 75% similarity (e.g., a 25% bit error rate difference), indicating that if the generated sound profile and a particular flagged sound profiles are greater than 75% similar, then the two sound profiles originate from the same sound. If a similarity value, however, is determined to be less than the first and/or second similarity threshold values, then the audio data corresponding to the two sound profiles likely are not from a same source, and therefore correspond to separate instances of the wakeword and a statement/request/question being uttered to two different voice activated electronic devices.

Continuing the aforementioned example, if the aforementioned audio fingerprint is determined to have a bit error rate difference less than 10% as compared to the 100th audio fingerprint of the 100 audio fingerprints, then the audio fingerprint's audio data and the audio data of the 100th audio fingerprint most likely originate from the same source. As the likelihood of two separate instances of the same audio data being captured by two separate voice activated electronic devices at substantially the same time is fairly small, both sets of audio data likely originate from a non-human source, such as a television commercial, television show, or movie, for instance. Therefore, because the first audio data likely does not correspond to a command spoken by an individual, the first audio data should be ignored.

If, at step 310, it is determined that the similarity value of the first sound profile is less than the similarity threshold value, then process 300 may proceed to step 320 where automated speech recognition processing for the first audio data may continue. For example, speech-to-text functionality may continue being executed on the first audio data. After some or all of the text data has been generated, the text data may be provided to natural language understanding functionality for determining an intent of the command represented by the first audio data.

At step 322, the n-th sound profile from the list of sound profiles may be discarded (e.g., deleted or removed from the list). For example, if there are 100 sound profiles stored within the list, where the 100th sound profile corresponds to the most recent audio data that has been received, then the 1st sound profile (e.g., a sound profile of audio data that is "oldest" or "least recent") may be discarded. At step 324, the first sound profile may be added to the list. This may enable the list of sound profiles corresponding to the most recently received audio data to remain dynamic such that any new sound profile generated for a next most recently received audio data is compared against the most current N sound profiles. In some embodiments, steps 322 and 324 may occur in parallel with one another and/or in parallel with step 320, however persons of ordinary skill in the art will recognize that any ordering of steps 320, 322, and 324 may be employed.

If, however, at step 310, it is determined that the similarity value of the first sound profile is greater than the similarity threshold value, then process 300 may proceed to step 312 where any remaining automated speech recognition processing being performed on the first audio data may be stopped. For example, speech-to-text functionality being performed on the first audio data may be stopped. If any text data that has thus far been generated, then that text data, at step 312, may be discarded.

At step 314, an instruction may be generated for a requesting device that sent the first audio data, and at step 316 the instruction may be sent to the requesting device. The instruction may cause the requesting device to return to a keyword spotting mode. For example, a current communication channel between voice controlled electronic device 10a and backend system 100 may be severed so no more data is communicated there between. In some embodiments, when the requesting device returns to the keyword spotting mode, the device may continue to monitor local audio for utterances of the wakeword. For example, voice controlled electronic device 10a may continue to monitor for detection of its wakeword, "Alexa," such that, when heard, voice activated electronic device 10a may record new audio data of a command spoken after the wakeword, and send that new audio data to backend system 100 for generating and sending back a response to the command.

At step 318, the first sound profile may be stored within sound profile database 270, and/or within memory/storage 254 of ASR module 258 or sound profile generation module 272, which may store a list of flagged, or blacklisted, sound profiles. Due to the first sound profile being substantially similar to another sound profile of recently received (e.g., within a few milliseconds) audio data, both the first audio data and the recently received audio data most likely originate from a non-human source. For example, both may originate from a television commercial that says commands 4a and 4b. Therefore, the first sound profile may be stored so that if any additional audio data is received due to another occurrence of another voice activated electronic device being activated by the television commercial, automated speech recognition processing for the additional audio data may be stopped. This may conserve processing and storage capabilities of backend system 100, and may help prevent any erroneous responses being generated by backend system 100 due to a non-human command that is detected. At step 326, the first sound profile may be added to a list of flagged sound profiles. For example, the first sound profile may be stored within sound profile database 270 as a flagged sound profile (e.g., a sound profile of known audio that includes an utterance of the wakeword). In some embodiments, step 326 may occur after step 318 or in parallel with step 318. Furthermore, in one embodiment, steps 318 and 326 may be combined into a single step.

In some embodiments, less than N similarity values, for N sound profiles of the N most recently received audio data, may be determined. The determination as to whether or not each of the N similarity values are greater than the similarity threshold value(s) may occur in parallel or serially. For example, all of the determinations of whether the N similarity values are greater than the similarity threshold value(s) may occur at the same time. As another example, a first similarity value may be compared with the similarity threshold value(s). If the first similarity value is greater than the similarity threshold value, or values, then no more similarity values are compared. If, however the first similarity value is less than the similarity threshold value or values, then a comparison of the second similarity value and the similarity threshold value(s) is determined. This process may then be repeated until a single instance of the similarity value being greater than the similarity threshold value(s) is found.

Figure 4:
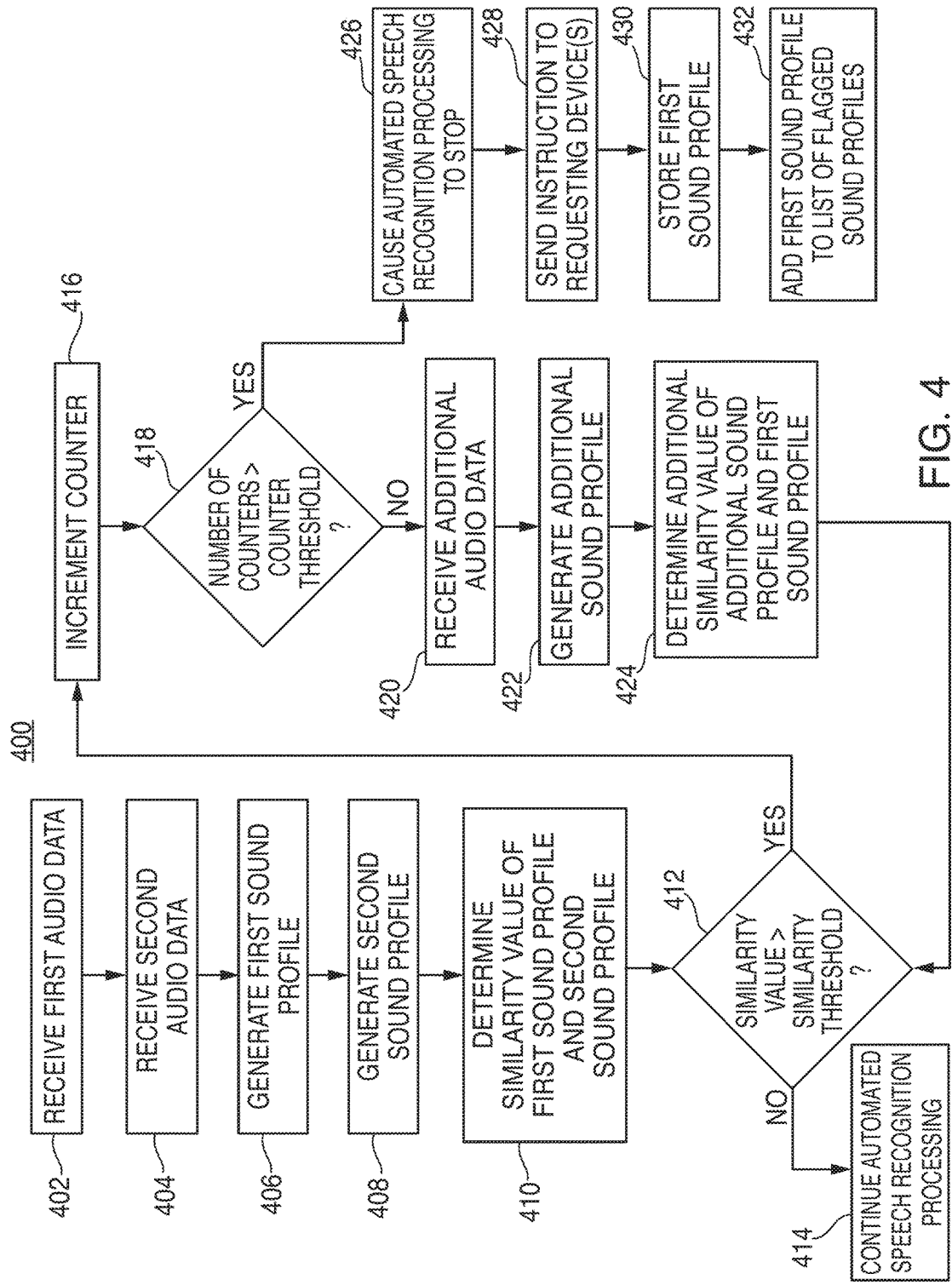
FIG. 4 is an illustrative flowchart of a process for determining that first audio data and second audio data are to be ignored, in accordance with various embodiments.

FIG. 4 is an illustrative flowchart of a process for determining that first audio data and second audio data are to be ignored, in accordance with various embodiments. Process 400 may begin at step 402. At step 402, first audio data representing a first sound may be received by backend system 100. For example, voice activated electronic device 10a may be activated by an utterance of the wakeword, such as command 4a (e.g., "Alexa—What is the traffic like?") included within a television commercial playing on television 20a. Voice activated electronic device 10a may record the audio of command 4a, and may send first audio data representing command 4a to backend system 100. In some embodiments, in addition to the first audio data, first user account information, such as a first customer identification number, associated with voice activated electronic device 10a may also be sent to backend system 100. The first user account information may indicate a user account associated with voice activated electronic device 10a. In another exemplary embodiment, first temporal metadata may be sent from voice activated electronic device 10a to backend system 100 with the first audio data. For example, a first timestamp indicating a time that voice activated electronic device 10a sent the first audio data representing command 4a to backend system 100. As another example, the first timestamp may indicate a time that voice activated electronic device 10a was activated (e.g., detected an utterance of the wakeword).

At step 404, second audio data representing a second sound may be received by backend system 100. For example, voice activated electronic device 10b may be activated by the same television commercial playing on television 20b, which also includes an utterance of the wakeword, such as within command 4b (e.g., "Alexa—What is the traffic like?"). Voice activated electronic device 10b may record the audio of command 4b, and may also send second audio data representing command 4b to backend system 100. Persons of ordinary skill in the art will recognize that although the first and second audio data both represent substantially similar commands, this may not always be the case, and the first and second audio data may differ slightly or greatly. For instance, background noise between the two different environments where voice activated electronic devices 10a and 10b are located may differ, the transmission speeds of television programming for either of devices 10a and 10b may differ, and/or the quality of the speakers for televisions 20a and 20b may vary. In some embodiments, in addition to the second audio data, second user account information, such as a second customer identification number, associated with voice activated electronic device 10b may also be sent to backend system 100. The second user account information may indicate a user account associated with voice activated electronic device 10b. In another exemplary embodiment, second temporal metadata may be sent from voice activated electronic device 10b to backend system 100 with the second audio data. For example, a second timestamp indicating a time that voice activated electronic device 10b sent the second audio data representing command 4b to backend system 100. As another example, the second timestamp may indicate a time that voice activated electronic device 10b was activated (e.g., detected an utterance of the wakeword).

In some embodiments, a determination may be made by backend system 100 as to whether or not the first user account information and the second user account information correspond to a same user account. For example, if two voice activated electronic devices are both located within earshot of a same television (e.g., within a same room or space), then both voice activated electronic devices may be activated by the same utterance of the wakeword within a television commercial or other media event being broadcast by the television. To backend system 100, this may be recognized as a substantially same scenario as if the same two voice activated electronic devices both detected an utterance of the wakeword from an individual. However, if two or more voice activated electronic devices corresponding to different user accounts both detect the same utterance of the wakeword at substantially the same time, followed by a same command, then this likely is due to a media event or other non-human source including an utterance of the wakeword. In a non-limiting embodiment, each voice activated electronic device may send user account information of a user account associated with that voice activated electronic device to backend system 100 with any audio data. Therefore, backend system 100 may recognize a user account associated with a particular voice activated electronic device, and may determine whether any additional audio data that has been received also corresponds to another voice activated electronic device associated with that user account. In some embodiments, prior to proceeding to step 406, a determination that the first audio data and the second audio data were sent by two voice activated electronic devices, each associated with a different user account, may occur.

In some embodiments, backend system 100 may also determine whether the first audio data and the second audio data correspond to two utterances happening at substantially the same time, or within a small temporal window of one another, based on the temporal metadata received. For example, a temporal difference between a first timestamp associated with a time that the first audio data was sent to backend system 100 and a second timestamp associated with a time that the second audio data was sent to backend system 100 may be determined. If the temporal difference is less than a predefined temporal threshold value, then the first and second audio data may be said to occur at a substantially same time. In some embodiments, the predefined temporal threshold value may be adjustable, such that the temporal window during which two separate events may be considered to have occurred at the same time may be defined by backend system 100. As an illustrative example, the predefined temporal difference value may be 50 milliseconds, 5 milliseconds, or any other suitable temporal value. In some embodiments, prior to proceeding to step 406, the determination that the first and second audio data occurred at the substantially same time may occur.

At step 406, a first sound profile of the first audio data may be generated by sound profile generation module 272. For example, a first audio fingerprint unique to the first audio data representing command 4a may be generated by a first sound profile generation module. At step 408, a second sound profile of the second audio data may also be generated by sound profile generation module 272. For example, a second audio fingerprint of the second audio data representing command 4b may be generated. In some embodiments, upon receipt by backend system 100, both the first audio data and the second audio data may be provided to ASR module 258, as well as sound profile generation module 272. In this way, sound profile generation and text data generation may occur in parallel with one another. In some embodiments, a same sound profile generation module 272 may generate both the first and second sound profile, however persons of ordinary skill in the art will recognize that this is merely exemplary, and different sound profile generation modules may, alternatively, generate the first and second sound profiles.

At step 410, a similarity value of the first sound profile and the second sound profile as compared with one another may be determined. For example, a bit error rate difference between the first audio fingerprint and the second audio fingerprint may be determined that indicates a how different the first audio fingerprint and the second audio fingerprint are. The similarity value may indicate how similar the first sound profile and the second sound profile are to one another. For example, if two audio fingerprints both correspond to the same audio, then the bit error rate difference (e.g., a difference in each fingerprint's bit values) between the two audio fingerprints should be substantially small.

At step 412, a determination may be made as to whether the similarity value from step 410 is greater than a predefined similarity threshold value. The predefined similarity threshold value may correspond to a threshold value indicating whether or not two sound profiles represent the same audio data. For example, if the similarity value is greater than the similarity threshold value, then the first audio data and the second audio data likely represent the same sound (e.g., commands 4a and 4b are the same). If the similarity value is less than or equal to the similarity threshold value, then the first audio data and the second audio data likely represent different sounds (e.g., commands 4a and 4b differ). In some embodiments, step 412 of FIG. 4 may be substantially similar to step 310 of FIG. 3 and the previous description may apply.

If, at step 412, it is determined that the similarity value of step 410 is less than or equal to the predefined similarity threshold, then process 400 may proceed to step 414. At step 414, automated speech recognition processing for both the first audio data and the second audio data may continue. For example, speech-to-text functionality may continue to be executed on first audio data and the second audio data. In some embodiments, step 414 of FIG. 4 may be substantially similar to step 320 of FIG. 3, and the previous description may apply. If, however, at step 412, it is determined that the similarity value of step 410 is greater than the predefined similarity threshold, then process 400 may proceed to step 416.

At step 416, a counter may incremented by one count to indicate that a first, or an additional, instance of two separate cases of the same audio being detected by two separate voice activated electronic devices at a substantially same time has occurred. For example, if this is a first occurrence of two separate voice activated electronic devices both detecting the same audio at substantially the same time, then the counter by increased from zero counts to one count. As another example, each audio stream (e.g., communications channel between one voice activated electronic device and backend system 100) may have its own separate counter associated therewith. In response to determining that one particular audio stream includes audio data that substantially matches other audio data of a different audio stream, a counter for the both audio streams may be incremented by one count.

At step 418, a determination may be made as to whether the number of counters is greater than a predefined counter threshold value. The predefined counter threshold value may be set at any particular value such that if the number of counters exceeds the predefined counter threshold value, then a specific action, such as stopping automated speech recognition processing from continuing, or ignoring received audio data, may occur. In some embodiments, the predefined counter threshold value may be set relatively low. For example, if the predefined counter threshold value is set at 0.5 counts, then when even two separate instances of the same audio data being provided to backend system 100 by two separate voice activated electronic devices (e.g., command 4a detected by voice activated electronic device 10a, and command 4b detected by voice activated electronic device 10b) are detected, automated speech recognition processing may be stopped. In some embodiments, the predefined counter threshold value may be set relatively high. For example, if the predefined counter threshold value is set at 999.5 counts, then 1,000 separate instances of the same audio data being provided to backend system 100 from 1,000 different voice activated electronic devices would cause automated speech recognition processing for those 1,000 instances of the same audio data to be stopped. In some embodiments, however, a determination may be made as to whether the number of counts of the counter is greater than a predefined count threshold value at step 418, where the number of counts may correspond to a single counter.

If, at step 418, it is determined that the number of counter is less than or equal to the predefined counter threshold value, then process 400 may proceed to step 420. At step 420, additional audio data may be received by backend system 100 from an additional voice activated electronic device. For example, another voice activated electronic device may be activated by the same commercial that output commands 4a and 4b, but on a separate television. This voice activated electronic device may capture audio of the commercial, and may then send the additional audio data representing the captured audio to backend system 100. Furthermore, additional user account information associated with the additional voice activated electronic device, as well as additional temporal metadata, may also be sent to backend system 100. In some embodiments, backend system 100 may, prior to proceeding to step 422, determine that the additional user account information is associated with a different user account as that of the first audio data and the second audio data (e.g., received from voice activated electronic devices 10a and 10b, respectively). In still yet another embodiment, backend system 100 may determine, based on the additional temporal metadata, that a time that the additional audio data was sent or detected, still occurred within a same temporal window as that of the first audio data and the second audio data. For example, backend system 100 may determine that a temporal difference between an additional timestamp of the additional audio data and the first timestamp and the second timestamp is less than the predefined temporal difference threshold value. At step 422, an additional sound profile of the additional audio data may be generated. In some embodiments, step 422 may be substantially similar to steps 406 and 408, with the exception that the additional sound profile may be generated based on the additional audio data.

At step 424, an additional similarity value may be determined for the additional sound profile and the first sound profile. For example, a bit error rate difference between the first audio fingerprint, corresponding to first audio data, and a third audio fingerprint corresponding to third audio data, may be determined. Persons of ordinary skill in the art will recognize that although the additional similarity value is determined using the additional sound profile (e.g., the third audio fingerprint) and the first sound profile, the additional similarity value may instead be determined using the additional sound profile and the second sound profile, and the aforementioned is merely exemplary. For instance, because the first and second sound profiles, for step 424, were determined to be similar to one another (e.g., "YES" at step 412), either of the first sound profile and the second sound profile may be used to compare against any additional sound profiles. In some embodiments, step 424 may be substantially similar to step 410, with the exception that the additional sound profile and one of the first and second sound profiles are used. After step 424, process 400 may return to step 412, where a determination is made as to whether or not the additional similarity value is greater than the predefined similarity threshold value. Process 400 may then proceed to steps 414 or 416, depending on the determination of step 412 using the additional similarity value.

If, at step 418, it is determined that the number of counters is greater than the predefined counter threshold value, then process 400 may proceed to step 426. At step 426, an instruction may be generated by sound profile generation module 272 that causes any remaining speech recognition processing that is being performed on the first audio data, second audio data, and/or additional audio data to be stopped. For example, first text data representing the first audio data and second text data representing the second audio data may have begun, or may be beginning, to be generated, and the instruction may cause that text data generation from continuing. In some embodiments, if any text data has thus far been generated, that text data may also be deleted in response to the automated speech recognition processing being stopped. At step 428, an instruction for any requesting device(s), such as voice activated electronic devices 10a and 10b, to return to a keyword spotting mode may be sent from backend system 100 to the requesting devices.

At step 430, the first sound profile, or the second sound profile, may be stored within sound profile database 270. At step 432, the first sound profile, or the second sound profile, may be added to a list of flagged sound profiles. For example, the first sound profile may be stored as a flagged or blacklisted sound profile because it most likely originated from a non-human source (e.g., television commercial, television program, movie, radio program, audio book, etc.). By storing the flagged first sound profile on sound profile database 270, future occurrences of the same audio may be recognized faster such that a particular requesting device may be ignored, and thereby conserving computing power of backend system 100. In some embodiments, steps 426, 428, 430, and 432 of process 400 may be substantially similar to steps 312, 314, 316, 318, and 326 of process 300, and the previous descriptions may also apply. Furthermore, persons of ordinary skill in the art will recognize that the second sound profile may additionally or alternatively be stored within sound profile database 270, and the storage of the first sound profile of steps 430 and 432 are merely illustrative.

Figure 5:
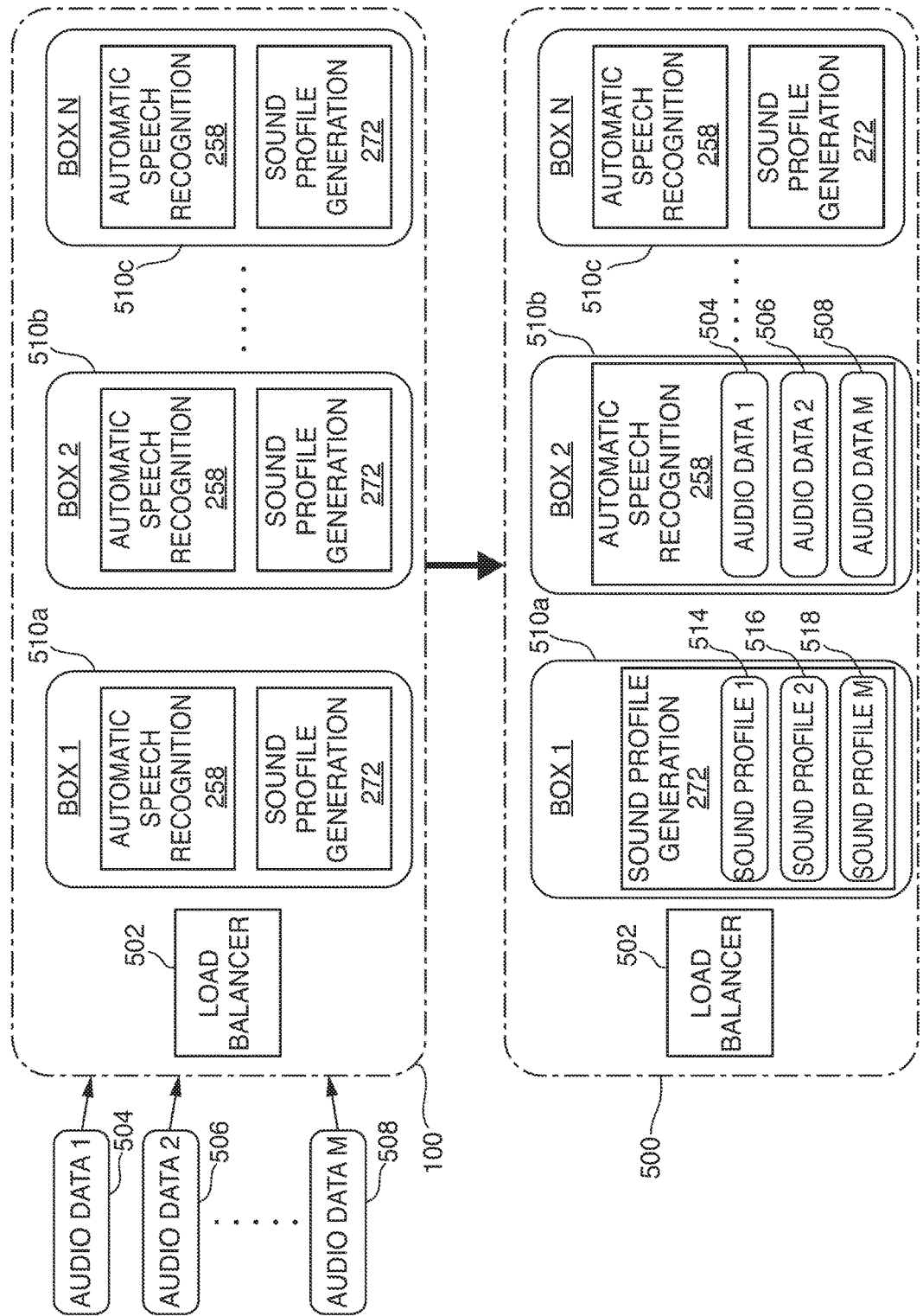
FIG. 5 is an illustrative diagram of a system for maximizing a number of sound profiles received within a particular computing device, in accordance with various embodiments.

FIG. 5 is an illustrative diagram of a system for maximizing a number of sound profiles received within a particular computing device, in accordance with various embodiments. In some embodiments, backend system 100 may receive a plurality of audio data, such as first audio data 504, second audio data 506, up to m-th audio data 508. In total, M different audio data, each representing one or more sounds may be received by backend system 100. In the illustrative embodiment, each of the M audio data may be sent to backend system 100 at a substantially same time, or within a relatively small temporal window. Furthermore, each of the M audio data may be sent from M different voice activated electronic devices (e.g., voice activated electronic devices 10a and 10b).

In the non-limiting embodiment, backend system 100 may include N computing devices each including an instance of ASR module 258 and an instance sound profile generation module 272. For example, a first box 510a may correspond to a first computing device that includes one instance of ASR module 258 and one instance of sound profile generation module 272. A second box 510b may, similarly, correspond to a second computing device including another instance of ASR module 258 and another instance of sound profile generation module 272. Furthermore, an N-th box 510c, corresponding to an n-th computing device, may include yet another instance of ASR module 258 and sound profile generation module 272. Persons of ordinary skill in the art will recognize that N may correspond to any number (e.g., 2, 3, 100, $10^4$, etc.).

Backend system 100, in the illustrative embodiment, may also include a load balancer 502. Load balancer 502 may correspond to any circuitry that assists in providing audio data 504, 506, and 508, as well as any other audio data received by backend system 100, to one or more of the N boxes. In some embodiments, load balancer 502 may also be configured to distribute functionalities of one or more of boxes 510a-c based on the number of audio data received. For example, initially each of boxes 510a-c may include one instance of ASR module 258 and one instance of sound profile generation module 272. Load balancer 502 may be configured to redistribute these functionalities to one or more other boxes within backend system 100. For example, backend system 500 may be substantially similar to backend system 100, with the exception that backend system 500 may have box 510a including only an instance of sound profile generation module 272, while box 510b may include only an instance of ASR module 258.

Audio data 504, 506, and 508 may be provided to ASR module 258 and sound profile generation module 272 in parallel, so load balancer 502 may distribute the tasks of one box to another box. For example, box 510a may only generates sound profiles of each of audio data 504, 506, and 508, while box 510 only generates text data for audio data 504, 506, and 508. By generating all of the sound profiles within one box, there may be a maximum likelihood of finding another similar sound profile within that one box. For instance, if audio data 504 and audio data 506 correspond to a same sound, then their sound profiles may be determined to be similar by sound profile generation module 272 of box 510a. If, however, the sound profile of audio data 504 was located within box 510a and the sound profile of audio data 506 was located within box 510b, boxes 510a and 510b would need to communicate with one another. For example, the first sound profile corresponding to audio data 504 may need to be shared with box 510b, as well as all of the N boxes, to see if the first sound profile matches any sound profiles generated by that box. This may take additional time to complete, and therefore the highest likelihood of finding a similar sound profile would occur if a there are a maximum number of sound profiles all located within a single box.

Figure 6:
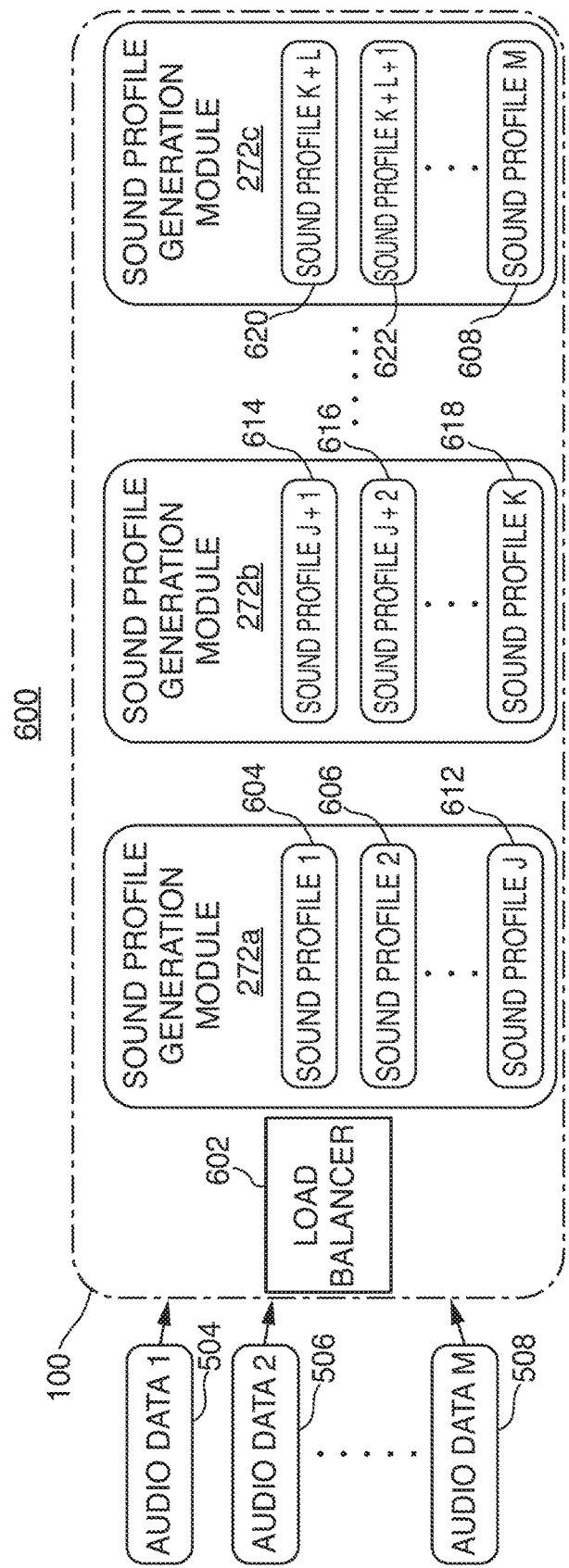
FIG. 6 is an illustrative diagram of another system for maximizing a number of sound profiles received on a computing device, in accordance with various embodiments.

FIG. 6 is an illustrative diagram of another system for maximizing a number of sound profiles received on a computing device, in accordance with various embodiments. System 600, in the illustrative non-limiting embodiment, includes a portion of backend system 100 representing N sound profile generation modules 272. For example, sound profile generation module 272a may correspond to a first sound profile generation module, sound profile generation module 272b may correspond to a second sound profile generation module, and sound profile generation module 272c may correspond to an N-th sound profile generation module. Backend system 100 may receive a plurality of audio data, such as first audio data 504, second audio data 506, up to M-th audio data 508. In total, M different audio data, each representing a sound or sounds may be received by backend system 100. In the illustrative embodiment, each of the M audio data may be sent to backend system 100 at a substantially same time, or within a relatively small temporal window. Furthermore, each of the M audio data may be sent from M different voice activated electronic devices (e.g., voice activated electronic devices 10a and 10b).

Upon receiving the M audio data (e.g., audio data 504, 506, and 508), load balancer 602 may distribute the M audio data about the N sound profile generation modules (e.g., boxes 610a-610c). Each sound profile generation module may be configured to generate and/or store J sound profiles therein, where J is a number. For example, each sound profile generation module may be configured to generate/store 50 audio fingerprints, where each of the 50 audio fingerprints corresponds to different audio data.

In some embodiments, load balancer 602 may place the first J sound profiles, such as first sound profile 604, second sound profile 606, up to Jth sound profile 612, into sound profile generation module 272a. The next J sound profiles may then be placed into sound profile generation module 272b by load balancer 602. For example, the J+1-th sound profile 614, J+2-th sound profile, up to the K-th sound profile may be stored within sound profile generation module 272b, where the K is a number equal to 2J such that the next J sound profiles are within sound profile generation module 272b. This distribution may continue, for instance, such that the N-th sound profile generation module 272c includes the K+L-th sound profile 620, K+L+1-th sound profile, up to the M-th sound profile 608, where L equals M−J.

By distributing the sound profiles of audio data 604, 606, to 608 amongst the N sound profile generation modules, each sound profile generation module may include a maximum number of sound profiles. This increases the likelihood of finding a similar sound profile intra-box (e.g., within a single sound profile generation module). In some embodiments, if two or more sound profiles within one sound profile generation module are determined to be similar to one another (e.g., they have a similarity value in excess of a similarity threshold value), then the sound profile(s) may be shared amongst the other sound profile generation modules to determine if any other sound profile generation modules include another instances of that sound profile. For example, first sound profile 604 and second sound profile 606, located within sound profile generation module 272a, may have a similarity value that is greater than a particular predefined similarity threshold value. First sound profile 604 and/or second sound profile 606 may then be shared amongst sound profile generation modules 272b and 272c to determine if any of the other sound profiles located within those sound profile generation modules correspond to audio data originating from a similar source (e.g., a television commercial). For example, sound profile 622 of sound profile generation module 272c may have a similarity value that when compared with first sound profile 604 is also greater than the predefined similarity threshold value. Therefore, the audio data corresponding to each of first sound profile 604, second sound profile 606, and K+L+1-th sound profile 622 is most likely due to three separate voice activated electronic devices all being activated by a same audio message, such as a television commercial including an utterance of the wakeword (e.g., "Alexa").

Figure 7:
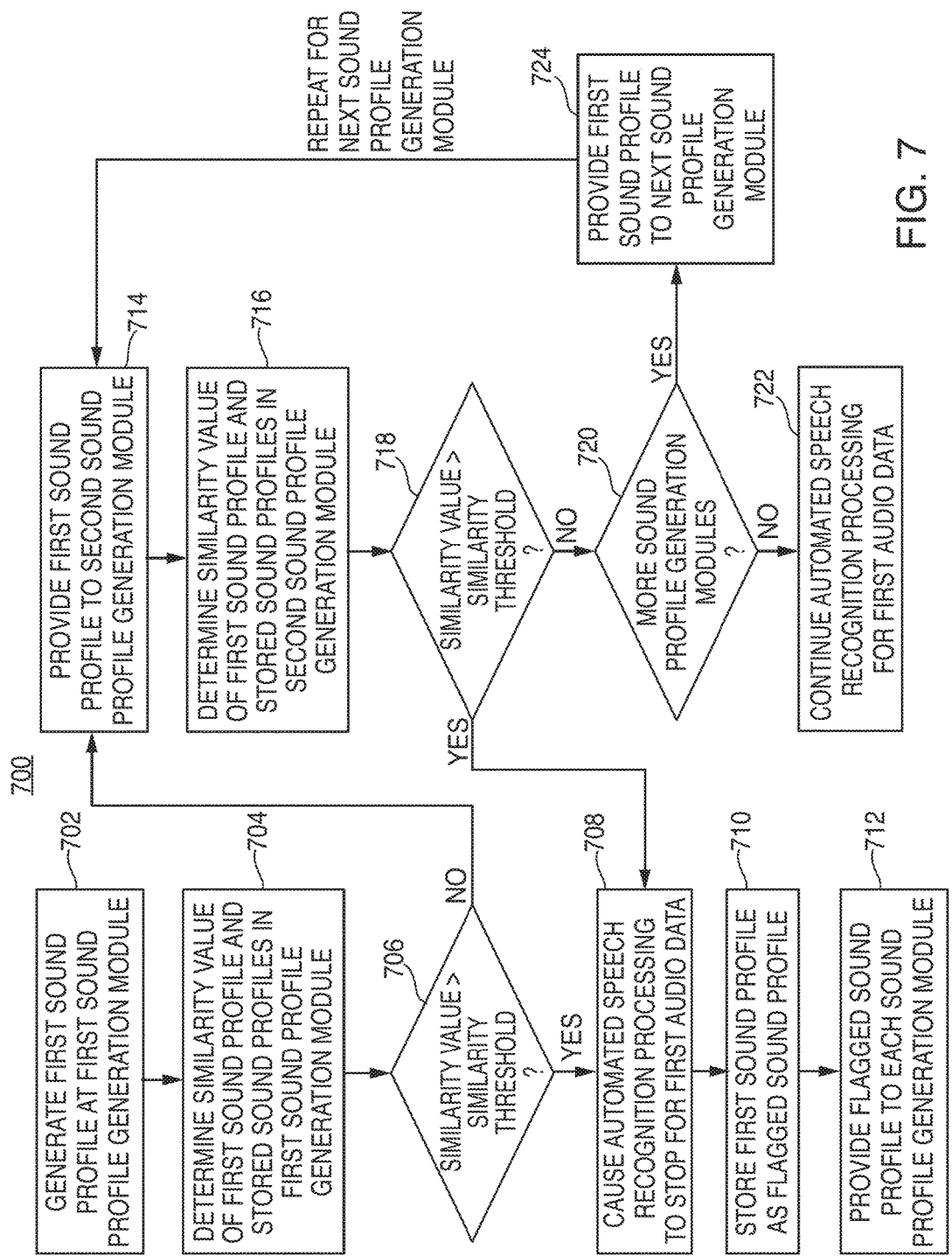
FIG. 7 is an illustrative flowchart of a process for determining whether a sound profile is similar to other sound profiles of recently received audio data processed by different computing devices, in accordance with various embodiments.

FIG. 7 is an illustrative flowchart of a process for determining whether a sound profile is similar to other sound profiles of recently received audio data processed by different computing devices, in accordance with various embodiments. Process 700, in some embodiments, may begin at step 702. At step 702, a first sound profile may be generated at a first sound profile generation module. For example, audio data received by backend system 100 may be provided to sound profile generation module 272, which may generate a sound profile of that audio data. At step 704, a similarity value of the first sound profile as compared with each sound profile stored on the first sound profile generation module may be determined. For example, a first similarity value of first sound profile 604 and second sound profile 606 may be determined by sound profile generation module 272a. Furthermore, a second similarity value of first sound profiles 604 and J-th sound profile 612 may also be determined by sound profile generation module 272a. At step 706, a determination may be made as to whether any of the similarity values determined at step 704 are greater than a predefined similarity threshold value. In some embodiments, steps 702, 704, and 706 may be substantially similar steps 302-310 of FIG. 3, and the previous descriptions may apply.

If, at step 706, it is determined that one or more similarity values are greater than the predefined similarity threshold value, then process 700 may proceed to step 708. At step 708, any remaining automated speech recognition processing for the first audio data corresponding to the first sound profile may be caused to stop. For example, if speech-to-text functionality is being executed on the audio data for generating text data, then that speech-to-text functionality may be stopped, and any text data that may have been generated thus far may be discarded. At step 710, the first sound profile may be stored as a flagged sound profile. Flagged sound profiles, in some embodiments, may be stored within sound profile database 270, as well as within memory/storage 254 of sound profile generation module(s) 272. Steps 708 and 710 may, in some embodiments, be substantially similar to steps 312-318 of FIG. 3, and the previous descriptions may apply.

At step 712, the flagged sound profile may be provided to each sound profile generation module located on backend system 100. For example, first sound profile 604, which may be stored as a flagged sound profile, may be provided to each of sound profile generation modules 272b and 272c, as well as any of the other sound profile generation modules on backend system 100. By doing this, any sound profiles located on any of the other sound profile generation modules that also correspond to audio data also originating from the same non-human source may be identified, and their corresponding audio data may be ignored.

If, however, at step 706, it is determined that the similarity value of step 704 is less than or equal to the predefined similarity threshold value, then process 700 may proceed to step 714. At step 714, the first sound profile may be provided to a second sound profile generation module. As none of the sound profiles stored within the first sound profile generation module are determined to be similar to the first sound profile, a comparison of the first sound profile to other sound profiles stored in other sound profile generation modules may occur. As mentioned previously, each sound profile generation module may only be capable of generating and/or storing a finite number of sound profiles, and it may be possible that one or more similar sound profiles may exist in other sound profile generation modules. As an illustrative example, sound profile 604 may be determined to be not similar to the other sound profiles stored within sound profile generation module 272a, and therefore sound profile 604 may be provided to sound profile generation module 272b to determine whether any of the sound profiles stored within sound profile generation module 272b match sound profile 604.

At step 716, new similarity values of the first sound profile and the sound profiles stored on the second sound profile generation module may be determined. For example, a third similarity value may be determined for first sound profile 604 as compared to the J+1-th sound profile 614, a fourth similarity value may be determined for first sound profile 604 as compared to the J+2-th sound profile 616, and a J-th similarity value may be determined for sound profile 604 as compared to the K-th sound profile 618. At step 718, a determination may be made as to whether any of the additional similarity values (e.g., the third similarity value, the fourth similarity value, to the J-th similarity value) are greater than the predefined similarity threshold value. In some embodiments, the similarity threshold value of step 718 may differ from the predefined similarity threshold value of step 706, however this is merely exemplary. If, at step 718, it is determined that one of the similarity values from step 716 is greater than the predefined similarity threshold, then process 700 may proceed to step 708.

If, however, at step 718, it is determined that none of the similarity values are greater than the predefined similarity threshold value, then process 700 may proceed to step 720. At step 720, another determination may be made as to whether any additional sound profile generation modules are located on backend system 100. If, at step 720, it is determined that there are no more sound profile generation modules on backend system 100, then process 700 may proceed to step 722, where automated speech recognition processing for the first audio data corresponding to the first sound profile may continue. In this particular scenario, there may only be two sound profile generation modules on backend system 100, and therefore if the first sound profile does not match any sound profiles stored on either of those two sound profile generation modules, then the first audio data likely emanated from an individual, and therefore the remaining processes of backend system 100 may occur.

If, at step 720 it is determined that there are additional sound profile generation modules located on backend system 100, then process 700 may proceed to step 724. At step 724, the first sound profile may be provided to the next sound profile generation module. For example, if there are three sound profile generation modules (e.g., sound profile generation modules 272a-c) located on backend system 100, then the first sound profile may be provided to the third sound profile generation module, as it has already been provided to sound profile generation modules 272a and 272b, for example. After step 724, process 700 may return to step 714 where the first sound profile is then used to determined similarity values with each of the sound profiles stored within the next sound profile generation module. Steps 714, 716, 718, and 720 may be repeated until a "YES" is determined at step 718, where process 700 then proceeds to step 708 to end automated speech recognition processing, or a "NO" is determined for step 720, indicating that there are no more sound profile generation modules to provide the first sound profile.

Figure 8:
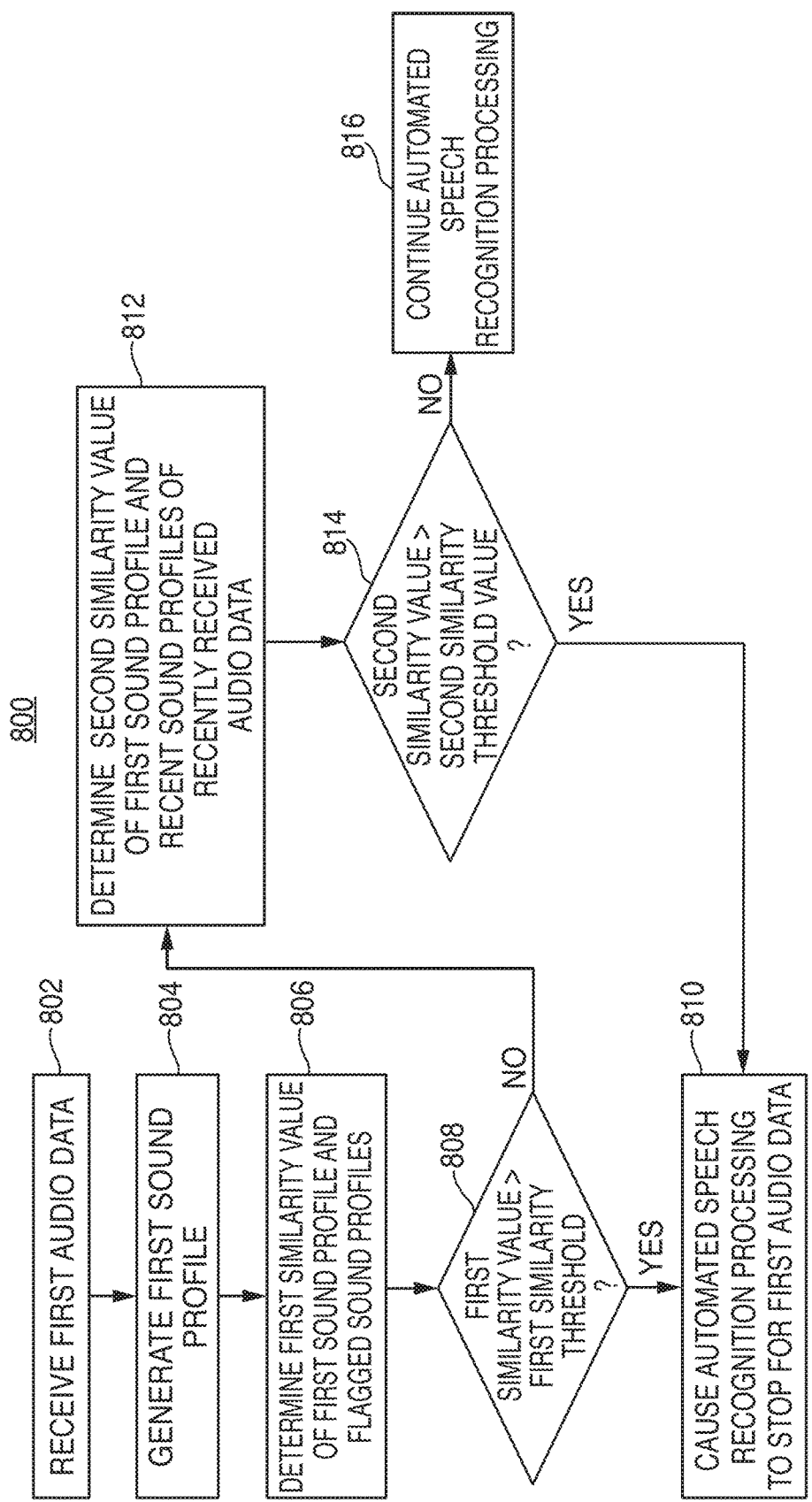
FIG. 8 is an illustrative flowchart of a process for determining whether a sound profile is similar to a flagged sound profile, in accordance with various embodiments.

FIG. 8 is an illustrative flowchart of a process for determining whether a sound profile is similar to a flagged sound profile, in accordance with various embodiments. Process 800, in one illustrative embodiment, may begin at step 802. At step 802, audio data representing a sound, such as speech or audio, may be received by backend system 100. At step 804, a sound profile of the audio data may be generated. For example, an audio fingerprint of the speech may be generated using sound profile generation module 272. In some embodiments, sound profile generation may occur in parallel to automated speech recognition processing as the audio data, upon receipt, may be sent to ASR module 258 and sound profile generation module 272. Steps 802 and 804 of FIG. 8, in some embodiments, may be substantially similar to steps 302 and 304 of FIG. 3, and the previous description may apply. Furthermore, in some embodiments, as described in greater detail below, the sound profile may be generated using a sound profile generation component of voice activated electronic device 10a or 10b.

At step 806, a first similarity value of the generated sound profile and the flagged sound profiles stored on sound profile database 270 and/or memory/storage 254 of sound profile generation module 272 may be determined. In some embodiments, one or more sound profiles of known audio that includes an utterance of a wakeword (e.g., "Alexa") may be stored on backend system 100, for instance within sound profile database 270. These sound profiles may be referred to as flagged sound profiles or blacklisted sound profiles due to the fact that they correspond to known audio that could falsely activated a voice activated electronic device. For example, a certain television commercial may be known to include an utterance of the phrase, "Alexa—What is the traffic like?" If a voice activated electronic device is located proximate to a television that plays this television commercial, then that voice activated electronic device may become activated due to the utterance of the wakeword "Alexa," may begin recording audio of the subsequent question, and may send audio data representing that recording to backend system 100 for generating a response. However, a sound profile of the television commercial, and in particular the portion of the television commercial including the utterance of the wakeword (e.g., the phrase "Alexa—What is the traffic like?") may be generated and stored within sound profile database 270 as a "flagged" sound profile. In this way, if another instance of that same television commercial activated a voice activated electronic device, the sound profile of the later instance may be "flagged" as originating from the television commercial at an earlier stage. In some embodiments, there may be multiple flagged sound profiles stored within sound profile database 270, where each flagged sound profile corresponds to different audio including an utterance of the wakeword.

At step 808, a determination may be made as to whether the first similarity value determined at step 806 is greater than a first predefined similarity threshold value. If, at step 808, it is determined that the first similarity value is greater than the first predefined similarity threshold value, then process 800 may proceed to step 810, where automated speech recognition processing currently being performed on the first audio data may be stopped. In some embodiments, steps 808 and 810 of FIG. 8 may be substantially similar to steps 310 and 312 of FIG. 3, respectively, and the previous descriptions may apply.

However, if at step 808 it is determined that the first similarity value is less than or equal to the first predefined similarity threshold value, then process 800 may proceed to step 812. At step 812, a second similarity value may be determined for the sound profile as compared to one or more recent sound profiles of recently received audio data. For example, the first sound profile may be compared with sound profiles of the last 100 audio data that have been received by backend system 100. In some embodiments, step 812 of FIG. 8 may be substantially similar to step 308 of FIG. 3, and the previous description may apply.

At step 814, a determination may be made as to whether or not the second similarity value is greater than a second predefined similarity threshold value. The second predefined similarity threshold value may, in some embodiments, be different than the first similarity threshold value of step 808. For instance, a higher similarity threshold value may be used for sound profiles of recently received audio data as opposed to a lower similarity threshold value being used for flagged sound profiles. However, in some embodiments, the second predefined similarity threshold value of step 814 and the first predefined similarity threshold value of step 808 may be substantially similar. If, at step 814, it is determined that the second similarity value is greater than the second predefined similarity threshold value, then process 800 may proceed to step 810, where automated speech recognition processing may be stopped. However, if at step 814, it is determined that the second similarity value is less than or equal to the second predefined similarity threshold value, then process 800 may proceed to step 816. At step 816, the automated speech recognition processing being performed on first audio data may continue. For example, speech-to-text functionality may continue being executed on the first audio data. In some embodiments, step 816 of FIG. 8 may be substantially similar to step 320 of FIG. 3, and the previous description may apply.

In some embodiments, as mentioned previously, the sound profile generation may be performed on voice activated electronic device 10a and/or 10b, which collectively may be referred to as voice activated electronic device(s) 10. For example, one or more sound profile generation modules, or sound profile generation functionality, may be stored within storage/memory 204 of voice activated electronic device 10. Furthermore, one or more flagged sound profiles, corresponding to audio that voice activated electronic device 10 is to ignore, may also be stored within storage/memory 204 of voice activated electronic device 10. In some embodiments, flagged sound profiles identified on backend system 100 may be provided to voice activated electronic device 10.

In one non-limiting, exemplary embodiment, voice activated electronic device 10 may continually capture local audio, and may generate a sound profile of that audio. For example, voice activated electronic device 10 may record audio in intervals of approximately two to five seconds. However, persons of ordinary skill in the art will recognize that any suitable temporal duration of the time intervals with which audio is recorded may be used, and the aforementioned is merely exemplary. A sound profile of that audio may be generated, and compared within one or more flagged sound profiles stored within storage/memory 204. As an illustrative example, voice activated electronic device 10 using microphone(s) 208 may record a first temporal interval of audio. A first audio fingerprint of the first temporal interval may be generated using a sound profile generation module resident on voice activated electronic device 10.

In some embodiments, the sound profile that has been generated may be sent to backend system 100 prior to audio data representing the audio being sent. After being received, backend system 100 may determine a similarity value of the sound profile as compared within one or more sound profiles of recently received audio data and/or with one or more flagged sound profiles. For example, process 300, 400, 700, and/or 800 may be performed using a sound profile received from voice activated electronic device 10. However, instead of stopping automated speech recognition processing from being stopped or being allowed to continue, backend system 100 may either close or keep open the communication channel existing between backend system 100 and voice activated electronic device 10. For instance, if a similarity value of the sound profile as compared with a flagged sound profile or a sound profile of recent audio data is greater than a predefined similarity threshold value, then backend system 100 may prevent the audio data representing the recorded audio of the sound profile from being received. As another example, backend system 100 may allow the audio data to be received, by may instead delete the audio data prior to performing any automated speech recognition processing from being performed, or may simply prevent any automated speech recognition processing from being performed. If, however, the similarity value is determined to be less than or equal to the predefined similarity threshold value, then backend system 100 may allow the audio data to be received, and may performed automated speech recognition processing thereon.

In some embodiments, the first audio fingerprint may be compared with any flagged audio fingerprints stored on voice activated electronic device 10. For instance, a similarity value, indicating a bit error rate difference of the first audio fingerprint as compared to a first flagged audio fingerprint, may be determined. If the similarity value is determined to be greater than a predefined similarity threshold value, then voice activated electronic device 10 may not send audio data representing the recorded audio to backend system 100. In some embodiments, voice activated electronic device 10 may perform one or more additional actions in response to the similarity value being greater than the predefined similarity threshold value. For instance, voice activated electronic device 10 may prevent one or more LED lights from illuminating.

If, however, the similarity value is determined to be less than or equal to the predefined similarity value, then voice activated electronic device 10 may begin packing and sending audio data representing the first recorded audio of the first temporal interval to backend system 100. However, if there are one or more additional flagged sound profile stored on voice activated electronic device 10, then one or more additional similarity values of the first sound profile as compared to the one or more additional flagged sound profiles may be determined. If none of the additional similarity values are determined to greater than the predefined similarity threshold value, then the first audio data representing the record audio of the first time interval may be packaged and sent to backend system 100. If one of the additional similarity values is determined to be greater than the predefined similarity threshold value, then the no audio data of the record audio may be sent to backend system 100, and the recorded audio may be deleted. Therefore, voice activated electronic device 10 may continue to record audio, generate sound profiles of the recorded audio, compare the sound profiles to flagged sound profiles, and determine whether or not the sound profile matches (e.g., have a similarity value greater than a similarity threshold) a flagged sound profile, indicating that that audio should not be sent to backend system 100 for further processing.

Figure 9:
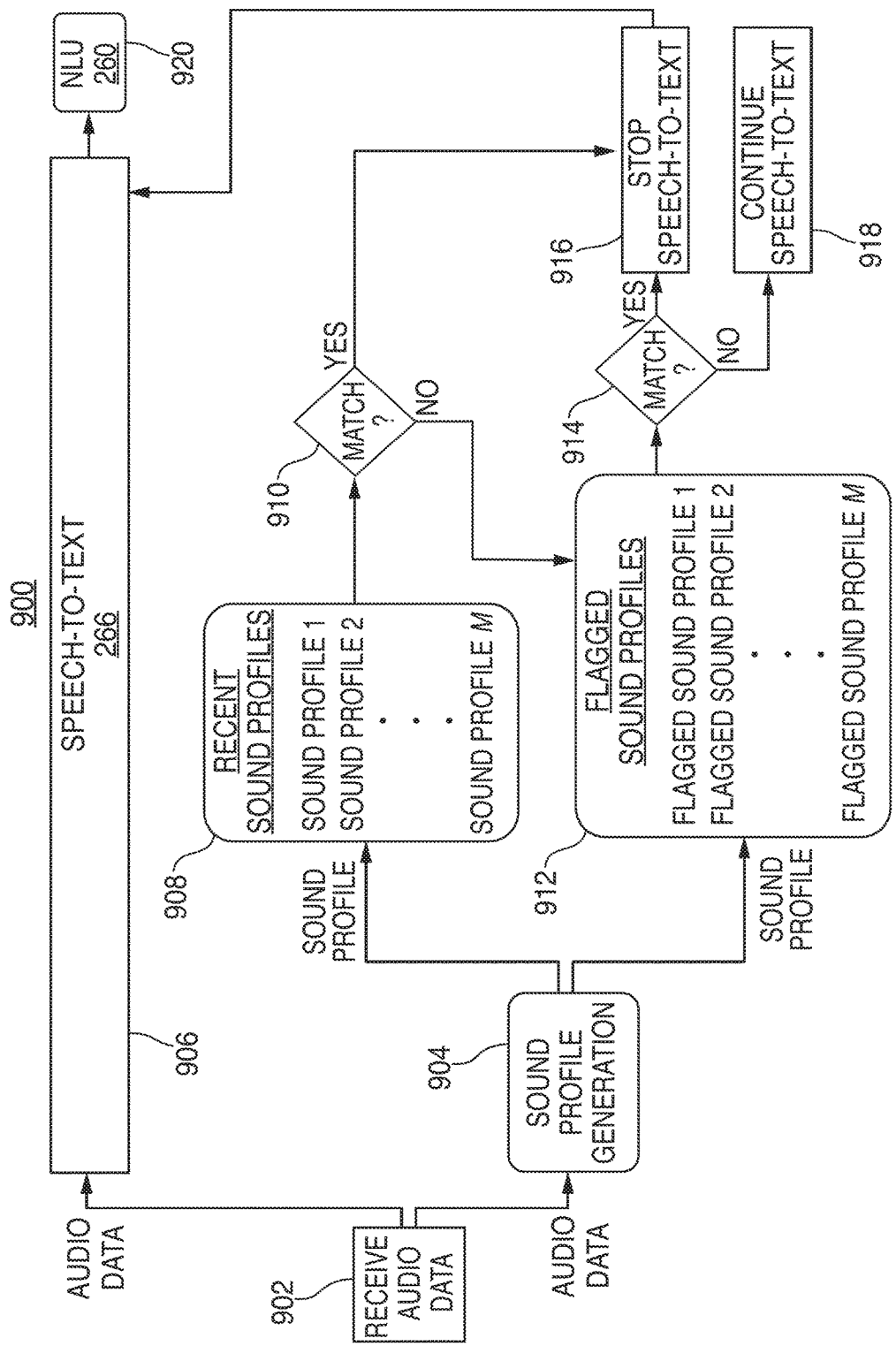
FIG. 9 is an illustrative diagram of an exemplary process for determining whether a sound profile of audio data matches another sound profile of recently received audio data or a flagged sound profile, while also beginning to execute speech-to-text functionality on the audio data, in accordance with various embodiments.

FIG. 9 is an illustrative diagram of an exemplary process for determining whether a sound profile of audio data matches another sound profile of recently received audio data or a flagged sound profile, while also beginning to execute speech-to-text functionality on the audio data, in accordance with various embodiments. Process 900, in some embodiments, may occur on backend system 100. At step 902, audio data representing speech or sound may be received by backend system 100 from voice activated electronic device 10. In response to receiving the audio data, backend system 100 may generate one or more copies of the audio data. For example, backend system 100 may generate a first copy of the audio data that will be provided to STT module 266, and may also generate a second copy of the audio data that will be provided to a sound profile generation module 272. However, persons of ordinary skill in the art will recognize that the original audio data and/or a copy of the audio data may be provided to both, or either, of STT module 266 and sound profile generation module 272, and the aforementioned is merely exemplary.

The audio data (e.g., a copy of the audio data or the original audio data that was received) may be sent to STT module 266 at step 906, while also being sent to sound profile generation module 272 at step 904. In some embodiments, steps 904 and 906 may occur at a substantially same time, or within a relatively small temporal window of one another. For example, upon receipt by backend system 100, the audio data, or a copy of the audio data, may, in parallel, be provided to both STT module 266 and sound profile generation module 272. This may allow STT module 266 to begin executing speech-to-text functionality on the audio data while sound profile generation module 272 generates a sound profile (e.g., an audio fingerprint) of the audio data.

While STT module 266 executes the speech-to-text functionality to the audio data at step 906, a sound profile may be generated at step 904. The sound profile may, at step 908, be compared within one or more recent sound profiles corresponding to an M most recently received audio data. For example, a similarity value may be determined for the generated sound profile as compared with each of the recent sound profiles. If the similarity value is greater than a predefined similarity threshold value, then at step 910, a match may be determined to exist. In this particular scenario, process 900 may proceed to step 916, where the speech-to-text functionality currently being performed to the audio data by STT module 266 may be stopped. In some embodiments, this may occur prior to STT module 266 generating some or all of the text data. If, at step 910, no match is determined to exist between the recent sound profiles and the generated sound profile, then process 900 may proceed to step 912. At step 912, the generated sound profile may be compared with one or more flagged sound profiles. For example, a new similarity value may be determined for the generated sound profile as compared with any flagged sound profiles stored on backend system 100, for instance within sound profile database 270. If the new similarity value is determined to be greater than a new, or the same, predefined similarity threshold value, then at step 914, a match between the generated sound profile and a flagged sound profile is said to exist. In this particular scenario, process 900 may then proceed to step 916, where the speech-to-text functionality may be stopped. However, if at step 914 it is determined that no match exists, then process 900 may proceed to step 918, where the speech-to-text functionality may continue to be performed to the audio data. For example, STT module 266 may generate text data from the audio data, and may provide the text data to NLU module 260 at step 920.

In some embodiments, the generated sound profile may first be compared with the flagged sound profiles at step 912, and if no match is determined to exist, then the generated sound profile may be provided to the recent sound profiles. In this particular scenario, if no match is again determined to exist between the generated sound profile and the recent sound profiles, then the speech-to-text functionality may be allowed to continue at step 918. However, if a match is determined to exist, then the speech-to-text functionality may be stopped at step 916.

The various embodiments of the invention may be implemented by software, but may also be implemented in hardware, or in a combination of hardware and software. The invention may also be embodied as computer readable code on a computer readable medium. The computer readable medium may be any data storage device that may thereafter be read by a computer system.

The above-described embodiments of the invention are presented for purposes of illustration and are not intended to be limiting. Although the subject matter has been described in language specific to structural feature, it is also understood that the subject matter defined in the appended claims is not necessarily limited to the specific features described. Rather, the specific features are disclosed as illustrative forms of implementing the claims.

What is claimed is:

1. A method, comprising:

receiving, at a backend system, first audio data;

receiving a first timestamp indicating a first time that the first audio data was sent to the backend system by a first user device;

receiving, at the backend system, second audio data;

receiving a second timestamp indicating a second time that the second audio data was sent to the backend system by a second user device;

determining that an amount of time between the first time and the second time is less than a predetermined period of time, which indicates that the first audio data and the second audio data were sent at a substantially same time;

generating a first audio fingerprint of the first audio data by performing a first fast Fourier transform ("FFT") on the first audio data, the first audio fingerprint comprising first data representing a first time-frequency profile of the first audio data;

generating a second audio fingerprint of the second audio data by performing a second FFT on the second audio data, the second audio fingerprint comprising second data representing a second time-frequency profile of the second audio data;

determining a bit error rate between the first audio fingerprint and the second audio fingerprint by determining a number of different bits between the first audio fingerprint and the second audio fingerprint, and then dividing the number by a total number of bits;

determining that the bit error rate is less than a predefined bit error rate threshold value indicating that the first audio data and the second audio data both represent a same sound; and storing the first audio fingerprint as a flagged audio fingerprint in memory on the backend system such that receipt of additional audio data that has a matching audio fingerprint is ignored by the backend system.

2. The method of claim 1, further comprising:

receiving, at the backend system, third audio data;

generating a third audio fingerprint of the third audio data by performing a third FFT on the third audio data, the third audio fingerprint comprising third data representing a third time-frequency profile of the third audio data;

determining an additional bit error rate between the third audio fingerprint and the flagged audio fingerprint;

determining that the additional bit error rate is less than the predefined bit error rate threshold value indicating that the third audio data also represents the same sound; and causing the backend system to ignore the third audio data such that a response is not generated to respond to the third audio data.

3. The method of claim 1, further comprising:
receiving, at the backend system, third audio data;
generating a third audio fingerprint of the third audio data by performing a third FFT on the third audio data, the third audio fingerprint comprising third data representing a third time-frequency profile of the third audio data;
determining a new bit error rate between the third audio fingerprint and the flagged audio fingerprint;
determining that the new bit error rate is greater than the predefined bit error rate threshold value indicating that third audio data does not represent the same sound; and
generating text data representing the third audio data by executing speech-to-text functionality on the third audio data.

4. The method of claim 1, further comprising:
determining a first user identifier associated with the first user device;
determining a second user identifier associated with the second user device;
determining that the first user identifier is different than the second user identifier;
generating a first instruction for the first user device that causes the first user device to return to a keyword spotting mode where the first user device will monitor sound signals received by a microphone for a subsequent utterance of a wakeword by continuously running the sound signals through a wakeword engine;
generating a second instruction for the second user device that causes the second user device to return to the keyword spotting mode;
sending the first instruction to the first user device; and
sending the second instruction to the second user device.

5. The method of claim 1, further comprising:
causing automated speech recognition processing to stop being performed to the first audio data; and
causing the automated speech recognition processing to stop being performed to the second audio data.

6. The method of claim 1, further comprising:
receiving, at the backend system, third audio data;
receiving a third timestamp indicating a third time that the third audio data was sent to the backend system by a third user device;
determining that an additional amount of time between the first time and the third time is greater than the predetermined period of time, which indicates that the first audio data and the third audio data were sent at a different time;
generating a third audio fingerprint of the third audio data by performing a third FFT on the third audio data, the third audio fingerprint comprising third data representing a third time-frequency profile of the third audio data;
determining a new bit error rate between the flagged audio fingerprint and the third audio fingerprint;
determining that the new bit error rate is greater than the predefined bit error rate threshold value indicating that third audio data does not represent the same sound;
receiving a first plurality of audio fingerprints corresponding to a second plurality of audio data that were received during the additional amount of time;
determining a third plurality of bit error rates between the third audio fingerprint and each of the first plurality of audio fingerprints;

determining that each of the third plurality of bit error rates are greater than the predefined bit error rate threshold value, indicating that each of the second plurality of audio data represent a different sound than the third audio data; and
causing automated speech recognition processing to continue to be performed to the third audio data.

7. The method of claim 6, further comprising:
determining a new amount of time between the third time and a fourth time, the fourth time corresponding to a fourth audio fingerprint of fourth audio data received prior to the first audio data, the second audio data, and the third audio data;
determining that the new amount of time is greater than the amount of time;
determining that the new amount of time is greater than the additional amount of time;
determining that the fourth audio fingerprint correspond to an oldest audio fingerprint of the plurality of audio fingerprints;
causing the fourth audio fingerprint to be deleted;
determining an updated first plurality of audio fingerprints comprising the first plurality of audio fingerprints minus the fourth audio fingerprint; and
generating a fourth plurality of audio fingerprints comprising the updated first plurality of audio fingerprints and the third audio fingerprint.

8. The method of claim 1, further comprising:
receiving a third audio fingerprint of third audio data, wherein the first audio fingerprint is generated at a first speech processing component, and the third audio fingerprint is generated at a second speech processing component;
causing the third audio fingerprint to be stored in the memory;
determining an additional bit error rate between first audio fingerprint and the third audio fingerprint;
determining that the additional bit error rate is less than the predefined bit error rate threshold value; and
causing automated speech recognition processing to stop being performed to the third audio data.

9. The method of claim 1, further comprising:
receiving, at the backend system, third audio data;
generating a third audio fingerprint of the third audio data by performing a third FFT on the third audio data, the third audio fingerprint comprising third data representing a third time-frequency profile of the third audio data;
determining an additional bit error rate between a first portion of the flagged audio fingerprint and a second portion of the third audio fingerprint;
determining that the additional bit error rate is less than the predefined bit error rate threshold value; and
causing automated speech recognition processing to stop being performed on the third audio data.

10. The method of claim 1, further comprising:
receiving, at the backend system, third audio data;
generating a third audio fingerprint of the third audio data by performing a third FFT on the third audio data, the third audio fingerprint comprising third data representing a third time-frequency profile of the third audio data;
determining an additional bit error rate between the third audio fingerprint and the flagged audio fingerprint;

determining that the additional bit error rate is less than the predefined bit error rate threshold value indicating that the third audio data also represents the same sound; and causing the third audio data to be deleted.

11. A backend system, comprising:
memory;
communications circuitry; and
at least one processor operable to:
  receive first audio data;
  receive a first timestamp indicating a first time that the first audio data was sent to the backend system by a first user device;
  receive second audio data;
  receive a second time stamp indicating a second time that the second audio data was sent to the backend system by a second user device;
  determine that an amount of time between the first time and the second time is less than a predetermined period of time, which indicates that the first audio data and the second audio data were sent at a substantially same time;
  generate a first audio fingerprint of the first audio data by performing a first fast Fourier transform ("FFT") on the first audio data, the first audio fingerprint comprising first data representing a first time-frequency profile of the first audio data;
  generate a second audio fingerprint of the second audio data by performing a second FFT on the second audio data, the second audio fingerprint comprising second data representing a second time-frequency profile of the second audio data;
  determine a bit error rate between the first audio fingerprint and the second audio fingerprint by determining a number of different bits between the first audio fingerprint and the second audio fingerprint, and then dividing the number by a total number of bits;
  determine that the bit error rate is less than a predefined bit error rate threshold value indicating that the first audio data and the second audio data both represent a same sound; and
  store the first audio fingerprint as a flagged audio fingerprint in the memory such that receipt of additional audio data that has a matching audio fingerprint is ignored.

12. The backend system of claim 11, wherein the at least one processor is further operable to:
  receive third audio data;
  generate a third audio fingerprint of the third audio data by performing a third FFT on the third audio data, the third audio fingerprint comprising third data representing a third time-frequency profile of the third audio data;
  determine an additional bit error rate between the third audio fingerprint and the flagged audio fingerprint;
  determine that the additional bit error rate is less than the predefined bit error rate threshold value indicating that the third audio data also represents the same sound; and
  cause the third audio data to be ignored such that a response is not generated to respond to the third audio data.

13. The backend system of claim 11, wherein the at least one processor is further operable to:
  receive third audio data;
  generate a third audio fingerprint of the third audio data by performing a third FFT on the third audio data, the third audio fingerprint comprising third data representing a third time-frequency profile of the third audio data;
  determine a new bit error rate between the third audio fingerprint and the flagged audio fingerprint;
  determine that the new bit error rate is greater than the predefined bit error rate threshold value indicating that third audio data does not represent the same sound; and
  generate text data representing the third audio data by executing speech-to-text functionality on the third audio data.

14. The backend system of claim 11, wherein the at least one processor is further operable to:
  determine a first user identifier associated with the first user device;
  determine a second user identifier associated with the second user device;
  determine that the first user identifier is different than the second user identifier;
  generate a first instruction for the first user device that causes the first user device to return to a keyword spotting mode where the first user device will monitor sound signals received by a microphone for a subsequent utterance of a wakeword by continuously running the sound signals through a wakeword engine;
  generate a second instruction for the second user device that causes the second user device to return to the keyword spotting mode;
  send the first instruction to the first user device; and
  send the second instruction to the second user device.

15. The backend system of claim 11, wherein the at least one processor is further operable to:
  cause automated speech recognition processing to stop being performed to the first audio data; and
  cause the automated speech recognition processing to stop being performed to the second audio data.

16. The backend system of claim 11, wherein the at least one processor is further operable to:
  receive third audio data;
  receive a third timestamp indicating a third time that the third audio data was sent to the backend system by a third user device;
  determine that an additional amount of time between the first time and the third time is greater than the predetermined period of time, which indicates that the first audio data and the third audio data were sent at a different time;
  generate a third audio fingerprint of the third audio data by performing a third FFT on the third audio data, the third audio fingerprint comprising third data representing a third time-frequency profile of the third audio data;
  determine a new bit error rate between the flagged audio fingerprint and the third audio fingerprint;
  determine that the new bit error rate is greater than the predefined bit error rate threshold value indicating that third audio data does not represent the same sound;
  receive a first plurality of audio fingerprints corresponding to a second plurality of audio data that were received during the additional amount of time;
  determine a third plurality of bit error rates between the third audio fingerprint and each of the first plurality of audio fingerprints;
  determine that each of the third plurality of bit error rates are greater than the predefined bit error rate threshold value, indicating that each of the second plurality of audio data represent a different sound than the third audio data; and cause automated speech recognition processing to continue to be performed to the third audio data.

17. The backend system of claim 16, wherein the at least one processor is further operable to:
 determine a new amount of time between the third time and a fourth time, the fourth time corresponding to a fourth audio fingerprint of fourth audio data received prior to the first audio data, the second audio data, and the third audio data;
 determine that the new amount of time is greater than the amount of time;
 determine that the new amount of time is greater than the additional amount of time;
 determine that the fourth audio fingerprint correspond to an oldest audio fingerprint of the plurality of audio fingerprints;
 cause the fourth audio fingerprint to be deleted;
 determine an updated first plurality of audio fingerprints comprising the first plurality of audio fingerprints minus the fourth audio fingerprint; and
 generate a fourth plurality of audio fingerprints comprising the updated first plurality of audio fingerprints and the third audio fingerprint.

18. The backend system of claim 11, wherein the at least one processor is further operable to:
 receive a third audio fingerprint of third audio data, wherein the first audio fingerprint is generated at a first speech processing component, and the third audio fingerprint is generated at a second speech processing component;
 cause the third audio fingerprint to be stored in the memory;
 determine an additional bit error rate between first audio fingerprint and the third audio fingerprint;
 determine that the additional bit error rate is less than the predefined bit error rate threshold value; and
 cause automated speech recognition processing to stop being performed to the third audio data.

19. The backend system of claim 11, wherein the at least one processor is further operable to:
 receive third audio data;
 generate a third audio fingerprint of the third audio data by performing a third FFT on the third audio data, the third audio fingerprint comprising third data representing a third time-frequency profile of the third audio data;
 determine an additional bit error rate between a first portion of the flagged audio fingerprint and a second portion of the third audio fingerprint;
 determine that the additional bit error rate is less than the predefined bit error rate threshold value; and
 cause automated speech recognition processing to stop being performed on the third audio data.

20. The backend system of claim 11, wherein the at least one processor is further operable to:
 receive third audio data;
 generate a third audio fingerprint of the third audio data by performing a third FFT on the third audio data, the third audio fingerprint comprising third data representing a third time-frequency profile of the third audio data;
 determine an additional bit error rate between the third audio fingerprint and the flagged audio fingerprint;
 determine that the additional bit error rate is less than the predefined bit error rate threshold value indicating that the third audio data also represents the same sound; and
 cause the third audio data to be deleted.

* * * * *